(12) United States Patent
Le

(10) Patent No.: US 9,670,563 B2
(45) Date of Patent: Jun. 6, 2017

(54) SORBENT MATERIAL

(75) Inventor: Van So Le, Gymea (AU)

(73) Assignee: Australian Nuclear Science and Technology Organisation, Lucas Heights (AU)

( * ) Notice: Subject to any disclaimer, the term of this patent is extended or adjusted under 35 U.S.C. 154(b) by 600 days.

(21) Appl. No.: 13/582,209

(22) PCT Filed: Mar. 3, 2011

(86) PCT No.: PCT/AU2011/000245
§ 371 (c)(1),
(2), (4) Date: Nov. 9, 2012

(87) PCT Pub. No.: WO2011/106847
PCT Pub. Date: Sep. 9, 2011

(65) Prior Publication Data
US 2013/0048568 A1    Feb. 28, 2013

(30) Foreign Application Priority Data
Mar. 3, 2010 (AU) .................. 2010900902

(51) Int. Cl.
*B01J 20/06* (2006.01)
*C22B 3/24* (2006.01)
*C22B 58/00* (2006.01)
*B01J 20/30* (2006.01)
(Continued)

(52) U.S. Cl.
CPC .................. *C22B 3/24* (2013.01); *B01J 20/06* (2013.01); *B01J 20/28004* (2013.01); *B01J 20/3078* (2013.01); *C22B 58/00* (2013.01); *G21F 9/12* (2013.01); *B01J 2220/58* (2013.01); *Y02P 10/234* (2015.11)

(58) Field of Classification Search
CPC .... C22B 3/24; B01J 20/06; B01J 20/08; B01J 20/30; B01J 21/00; B01J 21/06; B01J 21/063; B01J 21/066; B01J 29/40; B01J 29/405; B01J 29/60; B01J 29/605; B01D 15/00; B01D 15/08; B01D 15/20; B01D 24/00
USPC ....... 210/638, 644, 656, 660, 661, 670, 681, 210/682, 767
See application file for complete search history.

(56) References Cited

U.S. PATENT DOCUMENTS 4,264,468 A   4/1981   Neirinckx et al.
4,288,424 A   9/1981   Neirinckx et al.
4,330,507 A   5/1982   Lewis
(Continued)

OTHER PUBLICATIONS

Author Unknown, "A New 68Ge/68Ga Radioisotope Generator System" Technical Notes, Received Nov. 1976 pp. 117-120.
(Continued)

*Primary Examiner* — Allison Fitzsimmons
(74) *Attorney, Agent, or Firm* — Casimir Jones, SC

(57) ABSTRACT

A sorbent for sorbing radioactive ions is described. The sorbent comprises a porous crystalline powder of a metal oxide or mixed metal oxide. A process for making the sorbent comprises the steps of reacting a metal halide or a mixture of metal halides and an alcohol to form a gel; heating the gel to form a particulate material; exposing the particulate material to an oxidant to form a powder; and heating the powder to a temperature sufficient to at least partially melt or sinter particles of the powder so as to form the sorbent.

34 Claims, 11 Drawing Sheets

(51) Int. Cl.
  G21F 9/12  (2006.01)
  B01J 20/28  (2006.01)

(56) References Cited

U.S. PATENT DOCUMENTS

| | | | |
|---|---|---|---|
| 5,015,373 A * | 5/1991 | Carr et al. | 210/198.2 |
| 5,154,897 A | 10/1992 | Ehrhardt et al. | |
| 5,399,535 A * | 3/1995 | Whitman | B01J 20/28016 423/335 |
| 7,586,102 B2 | 9/2009 | Mourtada et al. | |
| 8,147,804 B2 | 4/2012 | Roesch et al. | |

OTHER PUBLICATIONS

Author Unknown, "An Improved Gallium-68 Cow" Technical Notes, Received May 19, 1961 pp. 62-63.
Author Unknown, "Gallium (68Ga) Chloride Solution for Radiolabelling" Pharmeuropa vol. 23 (3), Jul. 2011, pp. 457 and 508.
Aardaneh, K. et al. "Ga2O for Target, Solvent Extraction for Radiochemical Separation and SnO2 for the Preparation of a 68Ge/68Ga Generator" Journal of Radioanalytical and Nuclear Chemistry, vol. 268, No. 1 (2006) pp. 25-32.
Bao, B. et al. "A New 68Ge/68Ga Generator Based on CeO2" J. Radioanal. Nucl. Chem., 1996, Letters, 213 (4) pp. 233-238.
Blois, E. et al. "Characteristics of SnO2-based 68Ge/68Ga generator and aspects of radiolabelling DOTA-peptides" Applied Radiation and Isotopes, 69 (2011) pp. 308-315.
Bokhari, T. H. et al. "Concentration of 68Ga via solvent extraction" Applied Radiation and Isotopes, 67 (2009) pp. 100-102.
Browne, E. et al.: Book "Table of Radioactive Isotopes" Science, 1986, Publisher Wiley, ISBN 047184909X, 9780471849094Length 1056 pages. Three pages of table of contents provided.
Caletka, R. et al. "Separation of Germanium from Some Elements by Adsorption on Silica Gel" Journal of Radioanalytical Chemistry, vol. 21 (1974) pp. 349-353.
Chakravarty, R. et al. "Development of a nano-zirconia based 68Ge/68Ga generator for biomedical applications" Nuclear Medicine and Biology, 38 (2011) pp. 575-583.
Eckerman, K. et al. "Radionuclide Data and Decay Schemes", SMM MIRD Committee, pp. 117 and 121.
Egamediev, S. Kh. et. al. "Influence of preliminary treatment of aluminum oxide on the separation of 68Ge-68Ga radionuclide chain" Journal of Radioanalytical and Nuclear Chemistry, vol. 246, No. 3 (2000) 593-596.
Ehrhardt, G. et al. "A New Germanium-68/Gallium-68 Generator" The Journal of Nuclear Medicine, vol. 19 (8), 1978, pp. 925-929.
Gleason, G.I"A Positron Cow" Intl Journal of Applied Radiation and Isotopes, 1960, vol. 8, pp. 90-94.
Kopecky, P. et al. "68Ge-68Ga Generator for the Production of 68Ga in an Ionic Form" Intl Journal of Applied Radiation and Isotopes, 1974, vol. 25, pp. 263-268.
Kopecky, P. et al. "The Study of Conditions for the Preparation and Utilization of 68Ge-68Ga Generator" Intl Journal of Applied Radiation and Isotopes, 1973, vol. 24, pp. 73-80.

Kozlova, M.D. et al. "Development of 68Ge/68Ga Generator in Institute of Biophysics" Journal of Labelled Compounds and Radiopharmaceuticals, Apr. 1994, vol. 35, pp. 282-283.
Le, V.S. et al. "Development of 68Ga Generator at ANSTO", 1st World Congress on Ga-68 and Peptide Receptor Radionuclide Therapy, Theranosticcs, Bad Berka, Germany Jun. 23-26, 2011.
Le, Van So "68Ga Generator Integrated System: Elution-Purification-Concentrataion Integration" Theranostics, Gallium-68, and Other Radionuclides, 2013 pp. 43-75.
Li, Ming-Hsin "A new Ge-68/Ga-68 generator system using a higher sorption capacity resin as adsorbent for Ge-68" J Nucl Med. 2009; 50 (Supplement 2): 2137.
Lievens, P. et al. "Selective removal of germanium by retention on silica gel" Analytica Chimica Acta. 70 (1974) 462-464.
Loc'H, C. "A New Generator for Ionic Gallium-68" J Nucl Med 21: 171-173, 1980.
Loktionova, N. S. et al "Improved colum-based radiochemical processing of the generator produced 68Ga" Applied Radiation and Isotopes 69 (2011) 942-946.
McAlister, D. R. et al. "Automated two column generator systems for medical radionuclides" Applied Radiation and Isotopes 67 (2009) 1985-1991.
McElvany, K. et al. "Comparison of 68Ge/68Ga Generator Systems for Radiopharmaceutical Production" Intl. J. Appl. Radiat. Isot. vol. 35, No. 6, pp. 521-524 1984.
Neirinckx, R. et al. "Development of an Ionic 68Ge-68Ga Generator III. Chelate Resins as Chromatographic Substrates for Germanium" Int. J. Appl. Radiat. Isot. vol. 33, pp. 259 to 266, 1982.
Neirinckx, R. et al. "Potential column Chormatography for Ionic Ga-68. II: Organic Ion Exchangers as Chromatographic Supports" J Nucl Med 21: 81-83, 1980.
Neirinckx, R. et al. "Potential column Chromatography Generators for Ionic Ga-68. I. Inogranic Substrates" J Nucl Med 20: 1075-1079, 1979.
Pao, P.J. et al. "A new method for the preparation of 68 Ga-Generators following proton bombardment of gallium oxide targets" Journal of Radioanalytical Chemisty, vol. 64, No. 1-2 (1981) 267-272.
Pawlak, D. et al. "Method for Post-elution Concerntration and Acidity Reduction of Eluate Obtained from SnO2 Based 68Ge/68Ga Generator" World Journal of Nuclear Medicine, vol. 10 (1), Jun. 2011, pp. 78-79.
Schuhmacher, J. et al. "A New 68Ge/68Ga Radioisotope Generator System for Production of 68Ga in Dilute HCl-Authors' reply" Int. J. Appl. Radiat. Isot. vol. 32, p. 527, 1981.
Waters, S.L. "The Application of Hydrous Tin (IV) Oxide in Radiochemical Separations and, in particular, for the 68Ge/68Ga and 82Sr/82Rb Generator Sytems" Int. J. Appl. Radiat. Isot. vol. 34, No. 7, p. 1023, 1983.
Zhernosekov, K. P. et al. "Processing of Generator-Produced 68Ga for Medical Application" J Nucl Med 2007; 48: 1741-1748.
Zoller, F. et al. "Efficient post-processing of aqueous generator eluates facilitates 68Ga-labelling under anhydrous conditions" Radiochim. Acta 98, 157-160 (2010).

* cited by examiner

SORBENT MATERIAL

CROSS-REFERENCE TO RELATED APPLICATIONS

This application is a U.S. §371 National Phase Entry of pending International Patent Application No. PCT/AU2011/000245, International Filing Date Mar. 3, 2011, which claims priority to Australian Provisional Patent Application No. AU2010900902, filed Mar. 3, 2010, the contents of which are incorporated by reference in their entireties.

TECHNICAL FIELD

The present invention relates to a sorbent material and uses thereof.

BACKGROUND OF THE INVENTION

Short lived radioactive isotopes produced from radionuclide generators are commonly used in diagnostic nuclear medicine and in biomedical researches. The Tc-99m generator is a well-known example of a widely used generator used in single photon emission computed tomography (SPECT) for diagnostic imaging.

With the rapid expansion of the technique of tomographic reconstruction in Positron Emission Tomography (PET) imaging, the supply of positron emitting radionuclides has become crucial. The use of short lived radioisotopes $^{18}$F, $^{11}$C and $^{15}$O in PET imaging is well established. Unfortunately, these short-lived (half-life less than 2 hours) positron emitting radionuclides are all only available from expensive on-site cyclotrons operating in relatively few major hospitals. It is desirable to expand the use of positron emitting radionuclides produced from radionuclide generators in order to provide the superior benefits of PET based molecular imaging.

Of those positron emitting nuclides which may be produced by a generator, $^{68}$Ga isotope, with its desirable half-life of 68 minutes and generated from a long lived parent $^{68}$Ge of 287-day half-life, is known to have the highest potential for widespread and cost-effective application in daily clinical PET practice.

Bio-medically, ongoing research activities and current nuclear medicine applications of $^{68}$Ga are based on its favourable properties. Gallium is known as the second most effective chemotherapeutic agent after platinum due to its high and specific affinity toward tumour tissues. Well-known coordination chemistry of gallium is advantageous for radiolabelling of radiopharmaceuticals. The readiness of the $^{68}$Ga radioactive isotope to couple to small bio-molecules makes it potentially an alternative to $^{18}$F- and $^{11}$C-based PET radio-pharmacy. Several chelate compounds developed for radiolabelling of peptides and/or protein entities with metallic radionuclides are well suited to $^{68}$Ga labelling, $^{68}$Ga currently finds significant application in conventional nuclear medicine practice. To cite just two examples, $^{68}$Ga-EDTA is used for the detection of blood-brain barrier integrity and $^{68}$Ga-PLED and $^{68}$Ga-EDTA are used for renal function investigation.

$^{68}$Ga based PET radiopharmaceuticals under phase III clinical trial include $^{68}$Ga-DOTA-NOC ($^{68}$Ga-1,4,7,10-tetraazacyclo-dodecane-N,N',N'',N'''-tetraacetic acid-1-Nal3-octreotide), $^{68}$Ga-DOTA-TATE ($^{68}$Ga-1,4,7,10-tetraazacyclo-dodecane-N,N',N'',N'''-tetraacetic acid-tyrosine-3-octreotate), $^{68}$Ga-DOTA-Lanreotide ($^{68}$Ga-DOTA-2-NaI-Tyr$^3$-ThrNH$^2_8$-octreotide) and $^{68}$Ga-DOTA-TOC ($^{68}$Ga-1,4,7,10-tetraazacyclo-dodecane-N,N',N'',N'''-tetraacetic acid-tyrosine-3-octreotide) for PET imaging of several subtypes of somatostatin receptors for the imaging neuroendocrin tumor; $^{68}$Ga-DOTA-Bombesin ($^{68}$Ga-1,4,7,10-tetraazacyclo-dodecane-N,N',N'',N'''-tetraacetic acid DOTA-Bombesin) for PET imaging of gastro-intestinal, stromal, colon and prostate cancer; $^{68}$Ga-AMBA ($^{68}$Ga-DO3A-CH$_2$CO-Gly-4-aminobenzoy-Q-W-A-V-G-H-L-M-NH$_2$) and $^{68}$Ga-DOTA-D-Glu] gastrin ($^{68}$Ga-1,4,7,10-tetraazacyclo-dodecane-N,N',N'',N'''-tetraacetic acid-D-Glu] gastrin) for studies on NMB and GRP—R bombesin receptors and on medullary thyroid cancer, respectively.

With regard to its nuclear physics, $^{68}$Ga is considered as the second most important β+ emitter (after $^{18}$F), and may be efficiently used in PET imaging. It has the following favourable characteristics:

i. High positron abundance and good imaging resolution: 89.14% atoms decay β+ particles (with 511 KeV annihilation gamma ray of 178.2% intensity). 829.5 KeV positron radiation provides a PET imaging resolution of about 2.3 mm (bone) and 11.5 mm (lung) for living tissues (compared to 0.65 mm and 2.7 mm in the case of $^{18}$F). These values are well within the system resolution of modern PET cameras (about 4-5 mm) and are usable with high resolution PET system (resolution of about 3 mm).

ii. No associated gamma impact on PET images: insignificant amounts of associated gamma emissions (0.03407%) falling within the commonly used PET energy window of 350-700 KeV has almost no impact on PET images.

iii. Good conformation to conventional radiation safety: the Γ20 KeV exposure rate constant of 0.179 μSv·m$^2$/MBq·h (compared to 0.188 μSv·m$^2$/MBq·h for $^{18}$F) makes the use of $^{18}$FDG standard radiation safety automatic infusion system feasible.

In regard to economics and convenience of use $^{68}$Ga offers the following advantages.

Cost-effectiveness and on-demand availability: the long-lived parent nuclide $^{68}$Ge offers cost-effective PET imaging for a generator shelf-life of about 2 years.

A $^{68}$Ge/$^{68}$Ga generator also renders the $^{68}$Ga based PET radio-pharmacy independent of an onsite cyclotron. This means that this generator is ideally suited to on-demand availability of β+ emitter for biomedical experiments and clinical targeting imaging both in remote PET centres without cyclotron and also in cyclotron-operating PET centres.

It is predicted that $^{68}$Ga will become the $^{99m}$Tc for PET/CT. Kit-formulated precursors along with the use of $^{68}$Ga generators, similar to the $^{99m}$Tc in vivo kits, will enable these generators to become the mainstays of molecular imaging nuclear medicine.

To be successfully applied for, formulating $^{68}$Ga based targeting radiopharmaceuticals used in clinical PET imaging, and also for radiation safety reason, $^{68}$Ga solution produced from a $^{68}$Ge/$^{68}$Ga generator should be of very high radionuclidic purity, i.e. the $^{68}$Ge parent nuclide contamination in the $^{68}$Ga solution should be very low (preferably <10$^{-3}$%), due to long half-life of the $^{68}$Ge radionuclide. Additionally, chemical impurities, particularly metallic ion contaminants, in the $^{68}$Ga solution, should be kept as low, as possible to eliminate any concurrent coordination chemistry reactions which may reduce $^{68}$Ga labelling yield.

The availability of $^{68}$Ga solutions of high radioactive concentration (i.e. radioactivity per unit volume, Ci/mL) is also an important factor affecting the suitability of $^{68}$Ga for labelling micro quantities of biomedical substances currently used in the targeting radiopharmaceutical development.

In the past $^{68}$Ge/$^{68}$Ga generator systems were developed based on two different techniques. In the first technique, solvent extraction methods using acetylacetone-carbon tetrachloride/dilute HCl solution and 8-hydroxyquinoline/chloroform were used by different research groups (G. I. Gleason, Int. J. App. Radiat. Isotopes, 8, 90 (1960); Iofa et al., Radiokhemiya, 12, 796 (1970); Gary J. Erhardt et al., J. Nucl. Med., 19 (1978)). In a second technique, column based $^{68}$Ge/$^{68}$Ga generators were developed using different sorbents as generator column packing materials and alkaline, acidic or complexing agent containing aqueous solutions as eluents to separate $^{68}$Ga by an elution process from the parent nuclide $^{68}$Ge which was immobilized on the column. Among the column techniques that have been used, the following ones are worth mentioning.

Organic ion exchanger resin (Bio-Rad AG1-X8) column based $^{68}$Ga generator with elution with dilute HF solution and synthetic chelate resin (made by condensation of pyrogallol and formaldehyde) column based $^{68}$Ga generators were studied (R. D. Neirinckx et al., J. Nucl. Med., 21, 81-83 (1980); R. D. Neirinckx et al., Int. J. Appl. Radiat. Isot. 33, 259-266 (1982); R. D. Neirinckx et al., U.S. Pat. No. 4,264,468, Apr. 28, 1981; R. D. Neirinckx et al., U.S. Pat. No. 4,288,424, Sep. 8, 1981). Unfortunately, the radiation sensitivity of the organic matrices was unfavourable for the desired lifetime (at least about two years) of a $^{68}$Ga generator.

Alumina column combined with elution with dilute (0.005M) EDTA solution (M. W. Greene et al., Int. J. Appl. Radiat. Isot. 12, 62-63 (1961); P. Kopecky et al., Int. J. Appl. Radiat. Isot. 24, 73-80 (1973)) or high temperature treated alumina column combined with elution with dilute (0.1-0.2 M) HCl solution (S. Kh. Egamediev et al., J. Radioanal. Nucl. Chem., 246, 593-596 (2000); P. Kopecky et al., Int. J. Appl. Radiat. Isot. 25, 263-268 (1974)) was investigated for $^{68}$Ge/$^{68}$Ga generator development. Use of an alumina column based $^{68}$Ga generator with alkaline solution elution was also patented (R. E. Lewis et al., U.S. Pat. No. 4,330,507, May 18, 1982). The high content of Al$^{3+}$ ion in the $^{68}$Ga eluate, the use of a complexing agent (EDTA) containing solution for the elution and $^{68}$Ga eluate of low radioactive concentration were disadvantages for labelling PET radiopharmaceuticals.

Tin dioxide column based $^{68}$Ga generator with elution with 0.6 M-1.0 M HCl solutions was developed and is currently used (K. Aardaneh et al, J. Radioanal. Nucl. Chem., 268, 25-32 (2006); C. Loc'h et al, J. Nucl. Med., 21, 171-173 (1980); S. L. Waters et al., Int. J. Appl. Radiat. Isot. 34, 1023 (1983); K. D. McElvany et al, Int. J. Appl. Radiat. Isot. 35, 521-524 (1984)). The high content of metallic ion impurities in the $^{68}$Ga eluate, the use of stronger acidic solution for the elution and the $^{68}$Ga eluate of low radioactive concentration are undesirable factors in this system for the process of coordination chemistry labelling of PET radiopharmaceuticals.

Hydrous zirconium-oxide column based $^{68}$Ga generators with 0.1M-0.5 M HCl or HNO$_3$ solution elution were studied (P. J. Pao et al., J. Radioanal. Chem., 64, 267-272 (1981); R. D. Neirinckx et al, J. Nucl. Med., 20, 1075-1079 (1979)). Undesirably large volumes of eluent were necessary to elute $^{68}$Ga from the zirconium dioxide column and low $^{68}$Ga elution yield was reported.

Titanium dioxide, silicon dioxide, glass microsphere sorbents and cerium dioxide column based $^{68}$Ga generators with 0.1 M HCl solution elution have been reported (M. D. Kozlova et al., J. Lab. Comp. Radiopharm., 35, 282 (1994); R. D. Neirinckx et al., J. Nucl. Med., 20, 1075-1079 (1979); B. Bao et al., J. Radioanal. Nucl. Chem. Letters, 213, 233-238 (1996); G. J. Ehrhardt et al, U.S. Pat. No. 5,154, 897, Oct. 13, 1992). Besides the low radioactive concentration of $^{68}$Ga eluate obtained, the metallic ion impurities from dissolution of column packing materials remains a problem to be solved for these systems.

Polyantimonic acid column based $^{68}$Ga generators using elution with sodium oxalate solution were unsuitable for coordination chemistry labelling of targeting radiopharmaceuticals due to the capability of $^{68}$Ga to form stable complexes with oxalate (H. Arino et al, Int. J. Appl. Radiat. Isot. 29, 117-120 (1978)).

Currently commercial $^{68}$Ge/$^{68}$Ga generators are available based on a modified titanium dioxide column using 0.1 M HCl solution elution (Ecker & Ziegler Eurotope GmbH Berlin, Germany; Cyclotron Co. Ltd., Obninsk, Russia) and on a tin dioxide column using 0.6 M HCl solution elution (I.D.B Holland B.V.). The 5 mL $^{68}$Ga eluate and unavoidable high metallic ion contamination make the direct utilization of these for use in labelling radiopharmaceuticals impossible. Moreover the critical level of $^{68}$Ge breakthrough and acidity of the $^{68}$Ga eluate produced from these generator systems also present disadvantages which require further development of alternative sorbents for generator performance improvement.

In general, and particularly in radionuclide generator technology, useful sorbents require high chemical separation specificity, high radiation resistance and high chemical stability. The inorganic sorbents currently in use commonly have a hydrated amorphous structure, which is disadvantageous for chemical and physical stability. The low physical stability causes the sorbent particles to break easily and consequently the flow of fluid in the sorbent bed of chromatographic column is blocked or impeded. The low chemical stability causes leaching of metal ions from the sorbent material into the separated solute product, leading to contamination of the product with sorbent metal ions.

OBJECT OF THE INVENTION

It is the object of the present invention to substantially overcome or at least ameliorate one or more of the above disadvantages.

SUMMARY OF THE INVENTION

In a first aspect of the invention there is provided a sorbent for sorbing (e.g. adsorbing) radioactive ions, said sorbent comprising a porous (e.g. mesoporous and/or macroporous and/or microporous) crystalline powder of a metal oxide or mixed metal oxide. Particles of the sorbent may comprise, or may consist essentially of, sintered aggregates of nanoparticles.

The following options may be used in conjunction with the first aspect, either individually or in any suitable combination.

The metal(s) of the metal oxide or mixed metal oxide may be transition metals, for example Zr, Ti, Sn and/or Ge. The metal(s) may be in the +IV oxidation state.

The sorbent may have a single crystalline phase. It may comprise a porous crystalline powder of a mixed metal oxide having a single crystalline phase.

The sorbent may have a particle diameter between about 10 and about 200 microns. This may be a mean particle diameter, or a maximum particle diameter or a minimum particle diameter. It may have a pore diameter range of from about 10 to about 200 nm or about 50 to about 100 nm. It may have germanium adsorption capacity of at least 1.0 mg Ge per gram sorbent.

The sorbent may have a higher affinity for $^{68}$Ge than for $^{68}$Ga. The affinity for $^{68}$Ge may be at least about 10 times that for $^{68}$Ga.

In an embodiment there is provided a sorbent for sorbing radioactive ions, said sorbent comprising a mesoporous and/or macroporous crystalline powder of an oxide of Zr(IV), Ti(IV), Sn(IV) or Ge(IV), said powder having a particle diameter range of from about 50 to about 100 microns. In another embodiment there is provided a sorbent for sorbing radioactive ions, said sorbent comprising a mesoporous and/or macroporous crystalline powder of a mixed oxide of Zr(IV) together with at least one metal selected from the group consisting of Ti(IV), Sn(IV) and Ge(IV), said powder having a particle diameter range of from about 50 to about 100 microns. In another embodiment there is provided a sorbent for sorbing radioactive ions, said sorbent comprising a mesoporous and/or macroporous crystalline powder of a mixed oxide of Zr(IV) together with at least one metal selected from the group consisting of Ti(IV), Sn(IV) and Ge(IV), said powder having a particle diameter range of from about 50 to about 100 microns and a mean pore diameter of about 50 to about 100 nm.

In a second aspect of the invention there is provided a process for making a sorbent comprising:
a) reacting a metal halide or a mixture of metal halides and an alcohol to form a gel;
b) heating the gel to form a particulate material;
c) exposing the particulate material to an oxidant to form a powder; and
d) heating the powder to a temperature sufficient to at least partially melt or sinter particles of the powder so as to form the sorbent.

The following options may be used in conjunction with the second aspect, either individually or in any suitable combination.

The metal halide(s) may be transition metal halide(s), e.g. Zr, Ti, Sn and/or Ge halides. They may be halides of tetravalent transition metals. They may be metal chlorides. They may comprise a zirconium halide either alone or in combination with one or more halides of other metals, e.g. of Ti, Sn or Ge.

The alcohol may be a C1 to C20 (e.g. C2 to C4) alkanol, e.g. isopropanol. The molar ratio of metal halide(s) to alcohol may be about 1:1 to about 1:20, e.g. about 1:3 to about 1:10.

Step a) of the process may comprise the following sub-steps:
a-1) forming a reaction mixture from the metal halide or mixture of metal halides and the alcohol;
a-2) allowing the reaction mixture to heat spontaneously to an elevated temperature, (e.g. about 60 to about 100° C.) and maintaining the reaction mixture at the elevated temperature for sufficient time (e.g. about 2 to about 5 hours) to obtain a viscous solution, and
a-3) raising the temperature of the viscous solution to a gelation temperature (e.g. about 110 to about 125° C.) to form the gel.

Step b) may comprise heating the gel to a particle formation temperature (e.g. about 130 to about 150° C.) for sufficient time (e.g. about 30 to about 60 minutes) to convert the gel to the particulate material.

The oxidant of step c) may be an aqueous oxidant. It may be aqueous hypochlorite solution. It may be an alkaline oxidant solution. The alkaline solution may be a sodium hydroxide, potassium hydroxide or ammonium hydroxide solution. Step c) may additionally (optionally concurrently) comprise at least partially neutralising the particulate material from step b).

Step d) may comprise heating to at least about 500° C., or to between about 500 and about 1000° C.

The process of the second aspect may produce the sorbent of the first aspect. The invention also encompasses a sorbent made by the process of the second aspect.

In an embodiment there is provided a process for making a sorbent comprising:
a-1) forming a reaction mixture from a tetravalent transition metal halide or mixture of tetravalent transition metal halides and a C2 to C4 alcohol;
a-2) allowing the reaction mixture to heat spontaneously to an elevated temperature, (e.g. about 60 to about 100° C.) and maintaining the reaction mixture at the elevated temperature for sufficient time (e.g. about 2 to about 5 hours) to obtain a viscous solution,
a-3) raising the temperature of the viscous solution to a gelation temperature (e.g. about 110 to about 125° C.) to form a gel;
b) heating the gel to a particle formation temperature (e.g. about 130 to about 150° C.) for sufficient time (e.g. about 30 to about 60 minutes) to convert the gel to a particulate material;
c) exposing the particulate material to an alkaline oxidant solution to form a powder; and
d) heating the powder to a temperature of at least about 500° C. said temperature being sufficient to at least partially melt or sinter particles of the powder so as to form the sorbent.

In a third aspect of the invention there is provided a separation column for separating a first ion from a second ion, said column comprising:
a housing comprising a body, an inlet and an outlet;
a valve coupled to the outlet for controlling flow of a liquid from the column;
a sorbent according to the first aspect, or made by the process of the second aspect, disposed in the body of the housing, said sorbent having a higher affinity for the first ion than for the second ion; and
a liquid permeable restrictor disposed between the sorbent and the valve for preventing exit of the sorbent from the body of the housing.

The restrictor may be for example a frit. It may be a sintered frit, e.g. a sintered quartz or glass frit, a metal free plastic frit or some other type of frit. There may be a second liquid permeable restrictor at or near the inlet of the housing. The housing, the valve and the restrictor(s) may all be constructed from materials that are not rapidly degraded by radioactivity from the first and second ion. The materials may also not be degraded by acidic solutions, in particular by acidic solutions used in operation of the separation column. Suitable materials include for example metal-free plastic or quartz. The separation column may comprise a radiation shield. The shield may at least partially surround the housing and/or the valve. The separation column may be suitable for separation of radioactive ions. It may be suitable for separation of Ga-68 from Ge-68.

The third aspect may be considered to be directed to the sorbent of the first aspect disposed in a body of a housing which has an inlet and an outlet, wherein a valve is coupled, to the outlet for controlling flow of a liquid from the outlet and wherein a liquid permeable restrictor is disposed between the sorbent and the valve for preventing exit of the sorbent from the body of the housing.

In a fourth aspect of the invention there is provided a generator for generating a solution of a radioactive ion, said generator comprising a separation column according to the third aspect, said generator having a generating radioactive ion sorbed on the sorbent thereof. The generating radioactive ion is such that it decays to produces the radioactive ion and the generating radioactive ion has a greater affinity for the sorbent than does the radioactive ion.

In a fifth aspect of the invention there is provided use of a sorbent according to the first aspect, or a sorbent made by the process of the second aspect, for making a generator for generating a solution of a radioactive ion. This aspect also includes use of the sorbent for making a separation column according to the third aspect.

In a sixth aspect of the invention there is provided a method, of making a generator for generating a solution of a radioactive ion, said method comprising passing a solution comprising a generating radioactive ion into a sorbent according to the first aspect, or a sorbent made by the process of the second aspect, so as to sorb said generating radioactive ion onto the sorbent. The generating radioactive ion should be such that it decays to produces the radioactive ion. The generating radioactive ion should have a greater affinity for the sorbent than does the radioactive ion.

The sorbent may disposed in a column during said passing. It may be disposed in the column after said passing. It may be disposed in said column both during and, after said passing. The method may comprise the step of at least partially surrounding said column by a radiation proof housing. This step may be conducted prior to the step of passing the generating radioactive ion into the sorbent.

In a seventh aspect of the invention there is provided use of a sorbent according to the first aspect, or a sorbent made by the process of the second aspect, in the generation or purification of a solution of a radioactive ion. More generally, the invention provides use of a sorbent according to the first aspect, or a sorbent made by the process of the second aspect, for the at least partial separation of mixtures of ions, optionally mixtures of radioactive ions or mixtures of radioactive and non-radioactive ions. This separation may be accomplished by a method comprising applying the mixture to be separated to the sorbent, optionally disposed in a separation column, and eluting the sorbent (having the mixture applied thereto) with an eluent. The eluent should be one that is capable of selectively eluting one or more components of the mixture, i.e. of eluting said one or more components of the mixture while eluting one or more other components of the mixture to a lesser extent, optionally much lesser extent.

In an eighth aspect of the invention there is provided a method for generating a solution of a radioactive ion comprising:
  providing a sorbent according to the first aspect, or a sorbent made by the process of the second aspect, said sorbent having sorbed thereon a generating radioactive ion, said generating radioactive ion being such that it decays to produces the radioactive ion and said generating radioactive ion having a greater affinity for the sorbent than does the radioactive ion; and
  eluting the radioactive ion from the sorbent using an eluent.

The following options may be used in conjunction with the eighth aspect, either individually or in any suitable combination.

The generating radioactive ion may be $^{68}$Ge whereby the radioactive ion is $^{68}$Ga.

The eluent may be an acid. It may be a mineral acid. It may be a dilute mineral acid. It may have a concentration of about 0.01 to 1N.

The step of providing the sorbent having the generating radioactive ion sorbed thereon may comprise passing a solution comprising the generating radioactive ion into the sorbent so as to sorb said generating radioactive ion onto the sorbent.

The step of eluting may be conducted a plurality of times. In this case, each eluting step other than the first may be separated from the previous eluting step by a time of about 0.5 to about 2 half-lives of the radioactive ion.

BRIEF DESCRIPTION OF THE DRAWINGS

Embodiments of the present invention will now be described, by way of example only, with reference to the accompanying drawings.

DETAILED DESCRIPTION

Figure 1A:
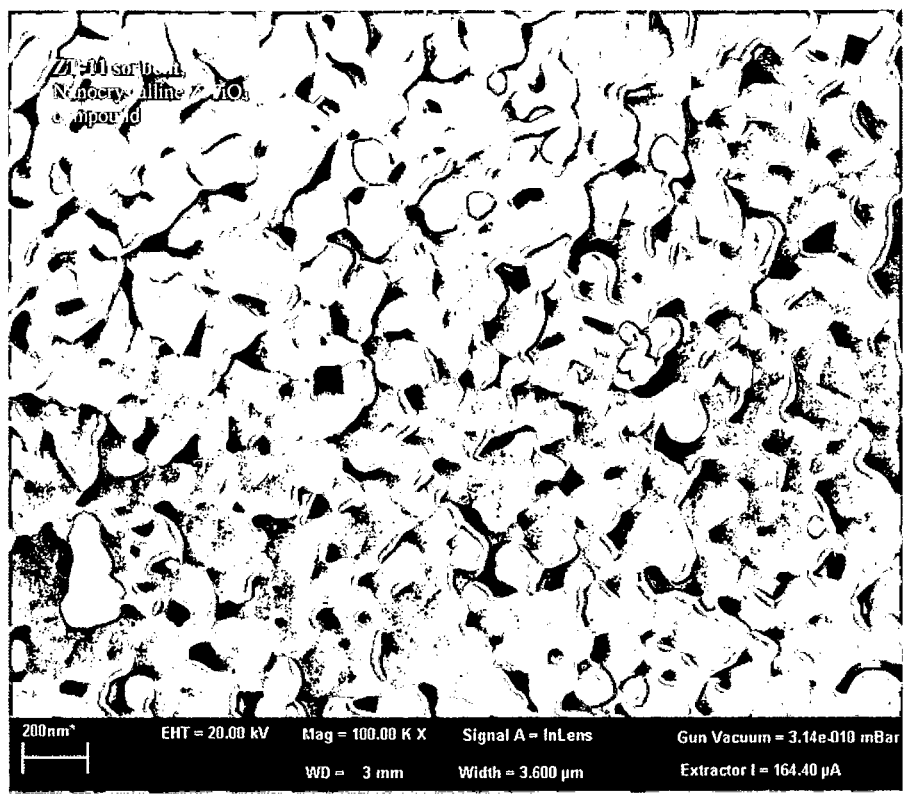
FIG. 1: Scanning electron microscope (SEM) images of the ZT-11 sorbent sample at different resolutions (a: 100,000×; b: 300,000×).

The present invention relates to new crystalline metal (e.g. tetravalent metal) oxide based inorganic sorbents, a process for preparation thereof and their use in separation processes and in radionuclide generators such as $^{68}$Ga generators. These sorbents avoid disadvantages of amorphous inorganic sorbents, so as to provide inorganic sorbents with improved performance. In specific embodiments, the present invention relates to methods for preparation of single and/or mixed crystalline tetra-valent metal oxide based inorganic polymer sorbents and to $^{68}$Ge/$^{68}$Ga radionuclide generator preparation from these sorbents. Whereas the sorbent is suitable for use in a $^{68}$Ga generator it may also be useful in other nuclide generators (for example $^{99}$Mo/$^{99m}$Tc, $^{188}$W/$^{188}$Re, $^{82}$Sr/$^{82}$Rb, $^{90}$Sr/$^{90}$Yb etc.) as well. Additionally, due to their high radiation resistance property, the sorbents of the present invention may be used in different radioisotope separation processes as well as in radionucleide generators. The sorbents may also used for separation of non-radioactive ions, or for separation of radioactive ions from non-radioactive ions.

The sorbent may be adsorbent. It may be absorbent. It may be both adsorbent and absorbent. It may be, or may comprise, an adsorbent material, e.g. an adsorbent particulate material. Where mention of "sorbing" or similar (e.g. sorbed, sorbent) is made in this specification, this may refer to adsorbing or it may refer to absorbing or it may refer to both.

The sorbents of the present invention may be single metal oxides or may be mixed metal oxides. They may comprise 1, 2, 3 or 4 different metal ions, or more than 4. They may for example be, or comprise, zirconium oxide, titanium oxide, tin oxide, germanium oxide, zirconium titanium oxide, zirconium tin oxide, zirconium germanium oxide or mixtures of any two or more of these. They may be, or may comprise, zirconium titanium tin oxide, zirconium titanium germanium oxide, zirconium titanium tin germanium oxide, titanium tin oxide or some other mixed metal oxide. They may be mixed oxides of zirconium and one or more of tin, titanium and germanium. Each independently, optionally all, of the metal ions in the sorbents may be in the +IV oxidation state. Thus the metal oxides may be oxides of metals capable of adopting a +IV oxidation state. They may be oxides of metals whose highest oxidation state is +IV.

The sorbent may be particulate. It may be in the form of a powder. The sorbent may have a particle diameter between about 10 and about 200 microns, or about 10 to 100, 10 to 50, 10 to 20, 20 to 200, 50 to 200, 100 to 200, 20 to 100, 20 to 50 or 50 to 100 microns, e.g. about 10, 20, 30, 40, 50, 60, 70, 80, 90, 100, 110, 120, 130, 140, 150, 160, 170, 180, 190 or 200 microns. This may be a mean particle diameter, or a maximum particle diameter or a minimum particle diameter. It may have a particle diameter range of from about 10 to about 200 microns or about 10 to 100, 10 to 50, 10 to 20, 20 to 200, 50 to 200, 100 to 200, 20 to 100, 20 to 50 or 50 to 100 microns. The range may be imposed by sieving the initially formed material or by crushing, grinding or otherwise pulverising it, or by both.

The particles of the sorbent may be approximately spherical, or may be polyhedral (e.g. having about 4 to about 50 faces, or about 4 to 20, 4 to 10, 10 to 50, 20 to 50, 10 to 20 or 12 to 18 faces, e.g. 4, 5, 6, 7, 8, 9, 10, 12, 16, 20, 24, 28, 32, 36, 40, 42, 46 or 50 faces or more than 50 faces). They may be irregular shaped. They may be needle shaped. They may be some other shape.

The sorbent may be porous. It may have a mean pore size (e.g. measured by BET) of about 10 to about 200 nm, or about 10 to 100, 10 to 50, 10 to 20, 20 to 200, 50 to 200, 100 to 200, 20 to 100, 20 to 50 or 50 to 100 nm, or of less than about 200 nm, or of less than about 150, 120, 100, 90, 80, 70, 60, 50, 40, 30, 20 or 10 nm e.g. a pore size of about 10, 20, 30, 40, 50, 60, 70, 80, 90, 100, 110, 120, 130, 140, 150, 160, 170, 180, 190 or 200 nm. The pore size distribution may be broad or it may be narrow. The distribution may be monomodal or may be bimodal or may have some other modality. In some embodiments the sorbent has mesopores and macropores. The mesopores may be about 2 to about 50 nanometers in mean diameter, or about 2 to 25, 2 to 10, 5 to 50, 10 to 50, 20 to 50, 5 to 25, 5 to 10, 10 to 25 or 10 to 30 nanometers, e.g. about 2, 3, 4, 5, 6, 7, 8, 9, 10, 15, 20, 25, 30, 35, 40, 45 or 50 nanometers. The macropores may be greater than about 50 nanometers in mean diameter, or greater than about 60, 70, 80, 90 or 100 nanometers, or may be about 50 to about 200 nanometers in diameter, or about 50 to 15, 50 to 100, 100 to 200 or 100 to 150 nanometers, e.g. about 50, 60, 70, 80, 90, 100, 110, 120, 130, 140, 150, 160, 170, 180, 190 or 200 nanometers in mean diameter. The sorbent may have micropores, optionally in combination with mesopores, macropores or both. The micropores (if present) may be less than about 2 nanometers in mean diameter, e.g. about 0.2 to 2 nanometers, or about 0.2 to 1, 0.2 to 0.5, 0.5 to 2, 1 to 2 or 0.5 to 1 nanometers, e.g. about 0.2, 0.3, 0.4, 0.5, 0.6, 0.7, 0.8, 0.9, 1, 1.1, 1.2, 1.3, 1.4, 1.5, 1.6, 1.7, 1.8, 1.9 or 2 nanometers in mean diameter.

The sorbent of the present invention is crystalline. In this context, the sorbent may not be entirely crystalline. It may be partially crystalline. It may be predominantly crystalline. It may be essentially all crystalline. It may be at least about 80% crystalline (by weight or by volume) or at least about 85, 90, 95, 99 or 99.9% crystalline, e.g. about 85, 86, 87, 88, 89, 90, 91, 92, 93, 94, 95, 96, 97, 98, 99, 99.1, 99.2, 99.3, 99.4, 99.5, 99.6, 99.7, 99.8, 99.9 or 100% crystalline.

The sorbent may have germanium adsorption capacity of at least 1.0 mg Ge per gram sorbent, or at least about 1.5, 2.5, 3, 3.5, 4, 4.5 or 5 mg Ge/g sorbent, or about 1 to about 10 mg Ge/g sorbent, or about 1 to 5, 1 to 2, 2 to 10, 5 to 10, 1.5 to 5, 1.5 to 3 or 2 to 5 mg Ge/g sorbent, e.g. about 1, 1.5, 2, 2.5, 3, 3.5, 4, 4.5, 5, 6, 7, 8, 9 or 10 mg Ge/g sorbent. It may have a higher affinity for $^{68}$Ge than for $^{68}$Ga. The affinity for $^{68}$Ge may be at least about 10 times that for $^{68}$Ga, or at least about 20, 50, 100, 200, 500, 1000, 2000, 5000, 10000, 20000, 50000 or 100000 times that for $^{68}$Ga, or about 10 to about 1000000 times that for $^{68}$Ga or about 10 to 100000, 10 to 10000, 10 to 1000, 10 to 100, 100 to 1000000, 1000 to 1000000, 10000 to 1000000, 100000 to 1000000 or 1000 to 100000 times that for $^{68}$Ga, e.g. about 10, 20, 50, 100, 200, 500, 1000, 2000, 5000, 10000, 20000, 50000, 100000, 200000, 500000 or 1000000 times that for $^{68}$Ga.

To make the sorbents, a metal halide or a mixture of metal halides (e.g. of 2, 3 or 4 or more than 4 metal halides) is reacted with an alcohol to form a gel. The metal halides may be transition metal halides. They may be one or more of zirconium halide, titanium halide, tin halide and germanium halide. Each, independently, may be a metal (IV) halide (e.g. zirconium (IV) chloride). The halide may be chloride. The alcohol may be an alkanol. It may be a straight chain alkanol or a branched chain alkanol. It may be a C2 to C4 (i.e. C2 or C3 or C4) alkanol, e.g. ethanol, propanol, isopropanol, butanol, isobutanol, tert butanol, etc. It may be a mixture of such alkanols. The molar ratio of the alcohol to the metal halide, or mixture of metal halides, may be about 3 to about 10 (i.e. about 3:1 to about 10:1) or about 3 to 7, 3 to 5, 3 to 4, 4 to 10, 6 to 10 or 5 to 7, e.g. about 1, 2, 3, 4, 5, 6, 7, 8, 9 or 10.

In the event that more than one metal halide is used, these may be premixed and then combined with the alcohol, or one metal halide may be combined with the alcohol and a second metal halide added to the mixture. In the latter case, the second metal halide may be added immediately after combining with the first metal halide, or it may be added after allowing the first metal halide to react for some time with the alcohol. Alternatively, each metal halide may be added gradually. In this case the additions of the two (or more) metal halides may be commenced simultaneously or they may be commenced some time apart. The reaction of metal halides with alcohols is commonly exothermic. In the present case, the exothermic reaction typically raises the temperature of the reaction mixture to about 60 to about 100° C., or about 60 to 90, 60 to 80, 60 to 70, 70 to 100, 80 to 100 or 70 to 90° C., e.g. about 60, 65, 70, 75, 80, 85, 90, 95 or 100° C. This temperature may depend in part on the identity and ratios of the reactants, the rate of addition of reactants, the shape and insulating properties of the vessel in which the reaction is conducted, the total volume of the reaction mixture etc. Once the temperature has stabilised due to the reaction exotherm, the temperature is generally maintained at that temperature for about 2 to about 5 hours, or about 2 to 4, 2 to 3, 3 to 5, 4 to 5 or 3 to 4 hours, e.g. about 2, 2.5, 3, 3.5, 4, 4.5 or 5 hours. This commonly results in formation of a viscous solution, which is thought to be due to alcoholysis of the metal halide(s) and formation of a partial condensate. This gel is then heated to a temperature sufficient to form a gel. This temperature will depend in part on the nature and ratios of the reagents used in the reaction. Typically the gelation temperature is about 110 to about 130° C., or about 110 to 120, 120 to 130 or 125 to 135° C., e.g. about 110, 115, 120, 125 or 130° C. The formation of the gel is commonly quite rapid at the appropriate temperature. The resulting gel is commonly water soluble, indicating that there is relatively little crosslinking in the gel.

The gel is then heated to a temperature sufficient to form a particulate material. This temperature is commonly about 130 to about 150° C., or about 130 to 140, 140 to 150 or 135 to 145° C., e.g. about 130, 135, 140, 145 or 150° C. Formation of the particulate material at this temperature may take about 30 to about 60 minutes, or about 30 to 45, 45 to 60 or 40 to 50 minutes, e.g. about 30, 35, 40, 45, 50, 55 or 60 minutes. The particulate material may comprise particles of a gel like material. It may be a particulate gel. These particles are commonly insoluble in water, suggesting that the step of heating to form the particulate material gives rise to some crosslinking within the material.

The particulate material is then commonly cooled to around ambient temperature. It is then subjected to an oxidation/neutralization step. A suitable oxidant is sodium hypochlorite (NaOCl), although other oxidants may be used, e.g. hydrogen peroxide. The oxidant may be present in an alkaline solution. The alkaline solution may have a concentration suitable to neutralise or at least partially neutralise the particulate gel. Thus a particularly suitable oxidant is an aqueous solution of sodium hydroxide and sodium hypochlorite. The oxidation is commonly conducted at or near room temperature. Thus the oxidation/neutralization step may comprise combining the particulate gel material with a molar excess of oxidant in aqueous alkaline solution. This step takes in general about 2 to about 6 hours, or about 2 to 4, 4 to 6 or 3 to 5 hours, e.g. about 2, 3, 4, 5 or 6 hours. This step results in formation of a powder. This powder is thought to be porous (e.g. mesoporous and/or macroporous), and it is thought that the oxidation/neutralization step described above provides porosity, as well as converting low oxidation state metal ions, which may form during reaction with the alcohol, to higher oxidation state (e.g. +IV).

The powder described above, is generally then heated to a temperature sufficient to at least partially melt or sinter the particles so as to form the sorbent. The temperature required will depend on the nature of the sorbent, in particular its melting or softening temperature. Suitable temperatures are generally from about 400 to about 1000° C., or about 500 to 1000, 600 to 1000, 700 to 1000, 400 to 800; 400 to 700, 400 to 600, 500 to 900, 500 to 700 or 700 to 900, e.g. about 400, 450, 500; 550, 600, 650, 700, 750, 800, 850, 900, 950 or 1000° C. The temperature should be sufficient to sinter the particles but not sufficient to completely melt them so as to form a solid mass.

The sorbent of the invention may be used in a separation column or in a radioactive ion generator. In separator columns to be used for separations involving one or more radioactive species (e.g. for separating one radioactive species from another radioactive species), and in radioactive generators, a column housing the sorbent may be at least partially enclosed in a radiation shield e.g. a lead shield. The shield should be sufficiently thick and opaque to radioactivity so as to be usable by an operator without risk from radioactivity on the column or generator.

In a suitable radioactive ion generator, a packed bed column comprising the sorbent of the invention has a generating radioactive ion sorbed on the sorbent thereof. The generating radioactive ion (parent ion) should such that it decays to produces the desired product radioactive ion (daughter ion) and the generating radioactive ion should have a greater affinity for the sorbent than does the radioactive ion. In preferred options, the decay rate of the parent ion is much slower than that of the daughter ion: Thus the invention is particularly well suited for generation of $^{68}$Ga (half-life about 1.1 hours) from $^{68}$Ge (half life about 271 days). When $^{68}$Ge and/or $^{68}$Ga is loaded onto the sorbent of a generator, the generator may be transported to a remote location and $^{68}$Ga milked from the column as and when required. This makes the short half life $^{68}$Ga isotope available where large scale bombardment devices are unavailable. As $^{68}$Ga decays to $^{68}$Zn quite rapidly, in order to obtain a suitable yield and purity of $^{68}$Ga from a generator as described above, the inventor has found it advantageous to elute repeatedly. Whereas each separate elution may have a relatively low quantity of $^{68}$Ga, the combined product may have superior yield and purity than that obtained by allowing greater time for $^{68}$Ga to accumulate. Thus sequential elutions may be conducted with a time spacing of about 0.5 to about 2 half lives of $^{68}$Ga, or about 0.5 to 1, 1 to 2 or 0.8 to 1.2, e.g. about 0.5, 0.6, 0.7, 0.8, 0.9, 1, 1.1, 1.2, 1.3, 1.4, 1.5, 1.6, 1.7, 1.8, 1.9 or 2 half lives. The eluent is commonly an acidic eluent, e.g. a mineral acid such as hydrochloric acid, nitric acid, etc. The acid is commonly aqueous, and may have a concentration of about 0.01 to 1.0 N, or about 0.01 to 0.5, 0.01 to 0.1, 0.01 to 005, 0.05 to 1, 0.1 to 1, 0.5 to 1, 0.05 to 0.5, 0.05 to 0.2 or 0.1 to 0.2, e.g. 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95 or 1.0 N.

The invention relates to a process for obtaining inorganic sorbents. These sorbents may comprise inorganic polymers or networks of metal oxides. The sorbents may be synthesised from readily available metal halides, such as $ZrCl_4$, $TiCl_4$, $SnCl_4$, $GeCl_4$, and short chain aliphatic alcohols such as isopropyl alcohol (iPrOH) under strictly controlled conditions. The synthesis may be optimised by adjusting reaction conditions including reaction temperature schemes and reactant ratios. High porosity of the sorbent is achieved by chemical treatment of an initially formed particulate gel with a suitable oxidant, commonly in the presence of aqueous alkali. High mechanical and chemical stability of the sorbents is obtained by a thermocrystallization process in which stable crystalline phases are formed so as to increase the stability of the sorbents. The process of chemical element doping with a suitable element at a particular mass ratio is thought to be to important for improving stability of the sorbents and for controlling their adsorption properties. In the present context, the term "doping" is used to describe the inclusion of suitable elements or ions in the crystalline structure of a host. This process does not alter significantly the host crystalline structure. In several examples of the present invention, zirconium oxide provides a host crystalline structure and Ti, Sn, Ge can serve as doping elements or ions. Because the ionic radius of Ti, Sn and Ge ions is smaller than that of Zr ions, the intercalation or doping of these ions into the zirconium oxide matrix may stabilize one of the crystalline phases of the zirconium oxide (tetragonal and monoclinic phases). Commercial single $ZiO_2$ sorbents are commonly amorphous and therefore have lower chemical and radiation resistance than the sorbents described herein. The single metal $ZiO_2$ sorbent product of the present invention (referred to herein as ZiSORB) has a crystalline structure and offers better chemical and radiation resistance than the commercial products. This product contains both crystalline phases but the tetragonal phase predominates. This may decrease the physical/mechanical stability of the particles, so the doping (i.e. mixed metal oxide) method was developed in order to stabilize one crystalline phase so as to generate a mono-crystalline product. For this reason the mixed metal sorbents ZT-11 or ZT-31 sorbents are particularly well suited for the very long lifetime Ge-68 generator. The single metal oxide sorbents, ZiSORB, TiSORB and SnSORB, may be better suited for use in other radionuclide generators which have shorter lifetime than Ge-68. Thus in some embodiments of the present invention the sorbent has a single crystalline phase.

Besides increasing stability, doping with other elements may modify the chemical (adsorption) properties (surface chemistry) of a sorbent, especially the acidity of the sorbent surface. This feature may be used to design specific sorbents for application to particular radionuclide separations.

The process for making the sorbents of the invention comprises allowing the reaction of metal halide (or mixture of metal halides) and alcohol to proceed under the heating spontaneously generated by the reactant mixture (step a of the process described herein). The polymerization process which ensues in this reaction mixture to form solid gel particles may be regarded as a condensation and/or polymerisation process.

In an example of the reaction, heating temperature was conducted in various stages in the range from 70° C. to 140° C. A specified amount of reactants, e.g. $ZrCl_4$, $TiCl_4$, $SnCl_4$ or $GeCl_4$, or a mixture of any two or more of these, was added to different amounts of iPrOH. In order to synthesize a single metal oxide sorbent, the corresponding single metal chloride was used, whereas a mixture of metal chloride reactants was added to iPrOH for the synthesis of mixed metal oxide sorbents. An exothermal chemical reaction started immediately after mixing the reagents, so as to raise the temperature of the reaction mixture by the completion of the reactant addition. The resulting mixture became viscous after maintaining the mixture at the temperature that was evolved naturally by the reaction for about 4 hours using a thermostat. At the end of this time, the temperature of the viscous mixture was increased to a higher temperature by more intensively heating the reaction mixture. At this time a water-soluble solid gel (the intermediate precursor) was rapidly formed. By further heating the reaction mixture to a still higher temperature (step b of the process), a water-insoluble solid polymer material in particulate or powder form slowly formed. The particle size of this material ranged from 0.10 mm to 0.01 mm. Maintaining the temperature of the reaction mixture for 45 minutes completed the formation of solid polymer powder or particulate material. This material was left to cool at room temperature overnight before starting a subsequent chemical treatment.

The chemical treatment (step c of the process) comprises treating the particulate gel with an oxidant, commonly in the form of an oxidant containing alkaline solution. In an example, the particulate gel was soaked in an alkali solution which contained oxidizing agent sodium hypochlorite (NaOCl). The resulting mixture was gently shaken by means of a mechanical shaker for at least 4 hours so as to convert the gel structure solid powder to a macroporous solid powder and to convert any lower valence metallic ions to their original 4+ valence. The required volume of the oxidant solution was determined so that the pH of the solution at the end of process was between 2 and 5.

At the end of this step, the liquid was removed. Suitable means for achieving this include by decanting (following settling) or by filtration, e.g. through a sintered glass filter. The powder was washed several times with water (preferably high purity water, e.g. doubly distilled and/or deionised) so as to remove all dissolved sodium and chloride ions. The solid matter was then dried at about 80° C. to dryness for 3 hours so as to obtain a white solid powder.

The white solid powder is then heated (step d of the process) at a temperature in the range from about 500° C. to about 900° C. This may be conveniently be performed in a furnace. A suitable time for heating is about 3 hours. The heating of step d allows the crystalline particles of the powder to melt and partially fuse so as to produce a solid powder of crystalline structure. The partial fusion is thought to cross-link the particles to create a hard porous matrix of solid material. The initially formed solid is commonly in the form of white solid powder particles composed of different clusters of greater than about 100 nm in size. The clusters are aggregates of semicrystalline nanoparticles (less than about 5 nm). The clusters appear to be held together by weak hydrogen bonds and Van der Waals bonds. Consequently the aggregate particles are macroporous and soft. During high temperature heating (sintering) the semicrystalline nanoparticles (less than about 5 nm) crystallize to form crystalline nanoparticles inside clusters. Simultaneously these crystalline nanoparticles partially melt and combine with other nanoparticles inside the same cluster to form larger crystalline particles. Because there is longer distance between the clusters than between nanoparticles within a single cluster, the nanoparticles belonging to different clusters do not combine with each other to form a single mass. Adjacent nanoparticles on the surface of clusters fuse into a limited area of the cluster surface to form a bridge so as to crosslink the clusters (at this stage the clusters have already become larger crystalline particles) to form sorbent particles. In this way meso/macro porosity formed between the former clusters may be maintained.

Figure 17:
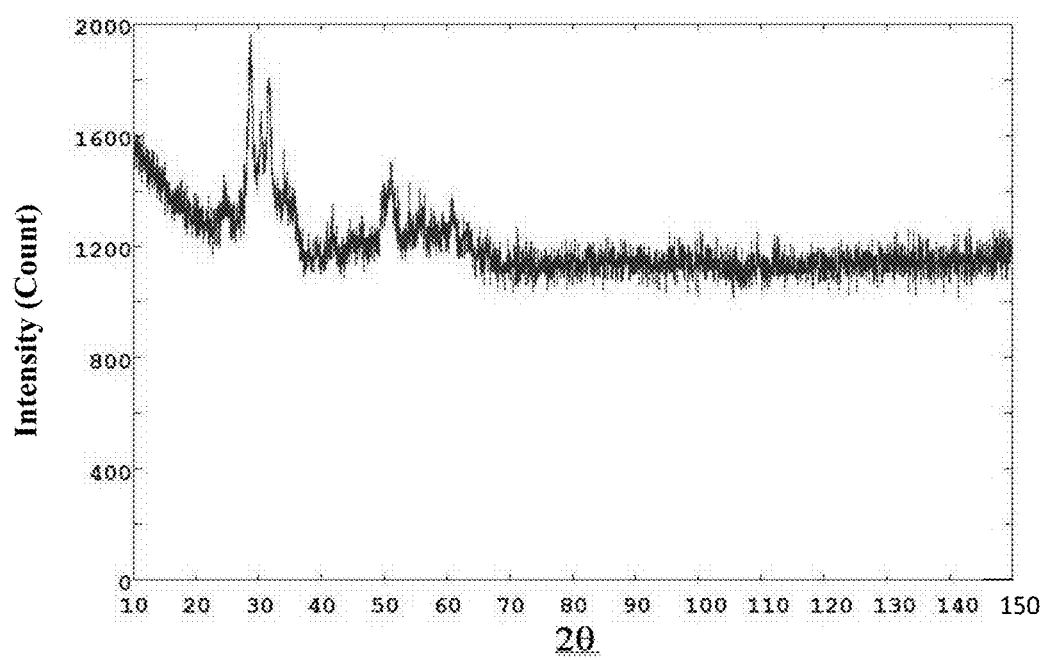
FIG. 17: X-ray diffraction pattern of semicrystalline nanoparticle ZT-31 before 900° C. sintering.
Figure 18:
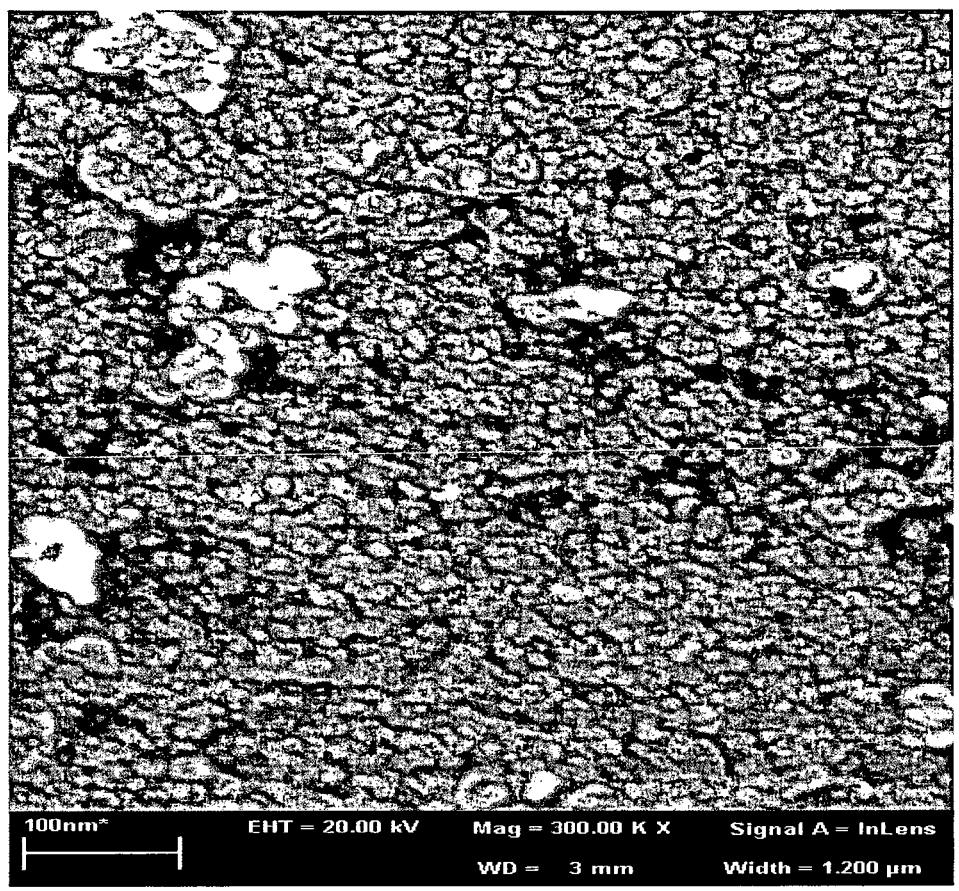
FIG. 18: Scanning electron microscope image of ZT-31 sorbent before 900° C. sintering.

The evidence for the process described above is based on x-ray diffraction patterns and electron microscopic images of semicrystalline nanoparticles of sorbent before sintering (for example FIGS. 17 and 18 respectively).

The high chemical and mechanical stability of the product is thought to result at least in part from the formation of stable crystalline mono-phase in the solid material. The crystalline structure of the product is stable to exposure at high radiation doses from radioactive materials. The doping by different amounts of metal ions (for example Ti, Sn, Ge) added to zirconium chloride solution in the synthesis is thought to be responsible for a stabilized crystalline phase which makes the product chemically and mechanically stable. The powders obtained using the above process have high stability and high porosity, and may be used as a state-of-the-art sorbent for different chemical separation processes, for example for the separation of highly radioactive materials.

The powders obtained as described above may be sieved so as to obtain a desired size fraction. In particular, the fraction of particle size between about 50 microns and about 100 microns may be collected to be used as a sorbent for chromatographic column packing applied to chemical separation processes. In an example, a $^{68}$Ga generator may be made based on the above-described inorganic sorbent. Thus a stock acidic $^{68}$Ge solution may be applied to a sorbent column containing a sorbent powder produced as described above. As $^{68}$Ge decays to form $^{68}$Ga, $^{68}$Ga will be formed on the column. Eluting the column with a dilute acidic solution will therefore generate a $^{68}$Ga-containing eluate, as the sorbent has a higher affinity for $^{68}$Ge than for $^{68}$Ga. A suitable apparatus (generator) for separating $^{68}$Ga from $^{68}$Ge ions may therefore comprise:

i. a column made from glass or radiation resistant thermoplastic material and having a column inlet and a column outlet, said column being provided with filter diskettes on both ends and closed by a plastic septum together with silicon rubber gaskets. The column may be capped by aluminum clamping lids;
ii. a sorbent as described in the present invention, having a higher affinity for $^{68}$Ge than for $^{68}$Ga and being packed into the column;
iii. a radiation protection shielding lead housing at least partially surrounding the column, said housing being provided with two ports for the tubing to the column outlet and column inlet.
iv. an acidic eluent supply system coupled to the sorbent, column inlet for supplying a eluent to the column inlet;
v. a pump for causing the eluent or other liquid as required to pass through the column. The pump may be located downstream of the column so as to cause the eluent or other liquid to pass through said column by way of suction from the pump.
vi. an outlet valve coupled to the column outlet, wherein, when the outlet valve is in a first position, eluent from the column is directed to a product container and when the outlet valve is in a second position, eluent from the column is stopped.
vii. a controller for controlling operation of the generator.

EXAMPLES

The following reactant mixtures, with different reactant ratios, have been used to prepare a range different sorbents as examples of the present invention:

0.5 mol $ZrCl_4$+0.5 mol $TiCl_4$+iPrOH for the sorbent ZT-11
0.75 mol $ZrCl_4$+0.25 mol $TiCl_4$+iPrOH for the sorbent ZT-31
0.5 mol $ZrCl_4$+0.5 mol $SnCl_4$+iPrOH for the sorbent ZS-11
0.75 mol $ZrCl_4$+0.25 mol $SnCl_4$+iPrOH for the sorbent ZS-31
0.5 mol $ZrCl_4$+0.5 mol $GeCl_4$+iPrOH for the sorbent ZG-11
0.75 mol $ZrCl_4$+0.25 mol $GeCl_4$+iPrOH for the sorbent ZG-31
1.0 mol $ZrCl_4$+iPrOH for the sorbent ZiSORB
1.0 mol $TiCl_4$+iPrOH for the sorbent TiSORB
1.0 mol $SnCl_4$+iPrOH for the sorbent SnSORB In the case of mixed metal oxide sorbents ZT-11, ZT-31, ZS-11, ZS-31, ZG-11 and ZG-31, the required quantity of $TiCl_4$, $SnCl_4$ or $GeCl_4$, was premixed with between 200 mL and 500 mL iPrOH and the required amount of $ZrCl_4$ was added to this mixture. For synthesis of single metal oxide based sorbents. ZiSORB, TiSORB and SnSORB, the required amount of $ZrCl_4$, $TiCl_4$ or $SnCl_4$ respectively was added to between 200 mL and 500 mL iPrOH.

An exothermal chemical reaction started immediately, raising the temperature of the reaction mixture at the end of reactant addition. The condensation reaction of the reactants was allowed to proceed under heating the reaction mixture under control from a thermostat with the following heating temperature scheme:

1) maintaining the temperature of reaction mixture in the range of 70° C. to 95° C. for about 4 hours to obtain a viscous solution,
2) further heating the viscous solution from 110° C. to 125° C. to obtain a water-soluble sticky soft gel (the intermediate precursor) which is very quickly formed at this temperature,
3) further heating the water-soluble sticky soft gel from 130° C. to 140° C. for 45 minutes to obtain a water-insoluble, solid polymer gel material in powder form of particle sizes from 0.10 mm to 0.01 mm.

The solid polymer gel powder was then left to cool at room temperature overnight before starting a further chemical treatment.

The next step was the chemical treatment of the solid polymer gel powder. The solid polymer gel powder was treated in an alkali solution which contains oxidizing agent NaOCl: about 10 mL 0.5 M NaOH solution containing 1% by weight NaOCl was used per gram of solid polymer gel powder. The solid powder/oxidant solution mixture was gently shaken using a mechanical shaker for at least 4 hours so as to convert the gel structure solid powder into a macroporous solid powder and to convert any lower valence metallic ions to their original 4+ valence. The required volume of the solution per gram solid gel powder was determined so that the pH of solution at the end of process was between 2 and 5. The solid matter was then separated by filtering through a sintered glass filter, washed several times with doubly distilled water so as to remove all dissolved sodium and chloride ions and dried at 80° C. for 3 hours to dryness so as to obtain a white solid powder.

The resulting white solid powder was heated at higher than 500° C. (the actual temperature depends on the particular sorbent being prepared) in a furnace for 3 hours so as to obtain a hard solid powder of crystalline structure. The resulting powder was sieved, collecting a fraction of particle size between 50 microns to 100 microns.

As discussed above, these powders may be used to produce a $^{68}$Ga generator. In the present specification where reference is made to "$^{68}$Ga" and "$^{68}$Ge", this should not necessarily be taken to refer to the neutral elements, but may refer to ions of these isotopes or to complexes thereof, depending on the context. Thus for example "$^{68}$Ga" may refer to a $^{68}$Ga species, e.g. $^{68}Ga^{3+}$, or a $^{68}$Ga complex, for example a citrate complex. Such complexes may themselves be neutral or may be electrically charged. In order to prepare the $^{68}$Ga generator, a stock acidic $^{68}$Ge solution was applied to a column containing the sorbent powder of the present invention. The stock acidic $^{68}$Ge solution is commonly a $^{68}$Ge solution between 0.05M HCl to 0.5M HCl. A suitable $^{68}$Ge concentration is from about 10 mCi $^{68}$Ge/mL to 50 mCi $^{68}$Ge/mL. The $^{68}$Ge solution volume applied for each sorbent column is commonly about 2.0 mL to 5 mL. During applying or loading the stock acidic $^{68}$Ge solution to the column, the $^{68}$Ge solution flows through the column under gravity or by means of a peristaltic pump. The preferred flow rate of the solution is from 0.05 mL/minute to 0.2 mL/minute—this may depend on the size of the column. Following the loading of the stock acidic $^{68}$Ge solution to a sorbent column, the column is washed with 10 mL to 20 mL 0.1 M HCl solution. Then the column is ready for regular elution (separation) of $^{68}$Ga daughter radioisotope solution for regular use.

Preferred inorganic polymer sorbents for a $^{68}$Ga generator are based on mixed metal oxides of zirconium and titanium or tin of molar metal element ratio between 0.5 to 0.75. The sorbents should have a higher affinity for $^{68}$Ge than for $^{68}$Ga so that $^{68}$Ga is eluted from the sorbent while the majority, preferably substantially all, of the $^{68}$Ge is retained on the sorbent. Typically the sorbent is such that the % breakthrough of $^{68}$Ge is less than about $10^{-2}$, or less than about $5*10^{-3}$, $10^{-3}$ or $5*10^{-4}$. The sorbent should be resistant to radiation, since the $^{68}$Ge typically resides on the column for long periods (commonly weeks, months or even years). For this reason the sorbent is commonly an inorganic material, for example metal oxide. Sorbents based on suitable mixed metal oxides described in this invention are effectively used. Commonly the sorbents are in solid particulate form, so that sorbent column contains a packed bed of the particulate sorbent. The sorbent may be porous, e.g. mesoporous, macroporous etc. The sorbent particles should be physically stable, so as the particulate integrity is maintained during a long operation of sorbent column without blockage. The sorbent should be chemically stable in the eluent of a wide range of acidity or pH. A typical sorbent column may contain about 0.5 to about 2 g of sorbent, or about 0.5 to 1, 1 to 2 or 0.8 to 1.5 g, e.g. about 0.5, 0.6, 0.7, 0.8, 0.9, 1, 1.1, 1.2, 1.3, 1.4, 1.5, 1.6, 1.7, 1.8, 1.9 or 2 g. The elution of the sorbent is commonly conducted with a mineral acid, commonly an aqueous hydrohalic acid such as hydrochloric acid. Suitable concentrations are about 0.01 to about 1M, or about 0.01 to 0.2, 0.01 to 0.1, 0.01 to 0.05, 0.05 to 1, 0.1 to 1, 0.5 to 1, 0.05 to 0.5 or 0.05 to 0.2, e.g. about 0.01, 0.05, 0.07, 0.08, 0.09, 0.1, 0.15, 0.2, 0.25, 0.3, 0.4, 0.5 or 1M. The amount of eluent used for eluting the sorbent will depend on the mass of sorbent used. The volume may be anywhere from about 2 to about 20 ml, or about 2 to 15, 2 to 10, 2 to 7, 2 to 5, 5 to 20, 5 to 20, 7 to 20, 10 to 20, 5 to 15, 5 to 10, 5 to 7 or 7 to 10 ml, e.g. about 2, 3, 4, 5, 6, 7, 8, 9, 10, 11, 12, 13, 14, 15, 16, 17, 18, 19 or 20 ml. The method may comprise loading the $^{68}$Ge onto the sorbent. The $^{68}$Ge may be loaded from a $^{68}$Ge stock solution. Thus the sorbent column inlet may be couplable to a $^{68}$Ge stock solution reservoir. It may be coupled to a fitting which may be coupled to a $^{68}$Ge stock solution reservoir. $^{68}$Ge decays to $^{68}$Ga with half-life of 270.8 days, emitting gamma radiation in the process. $^{68}$Ga in turn decays to non-radioactive, stable $^{68}$Zn with a half-life of 1.1 hours. Thus $^{68}$Ge may be loaded onto the sorbent, where it is retained due to its high affinity for the sorbent, and $^{68}$Ga may be milked from the sorbent column as required. It may be then purified using the elution column as described in a copending application of the present applicant and having the same inventor, entitled "Gallium-68 purification" and claiming priority from Australian provisional application AU2010900900, the entire contents of which are incorporated herein by cross reference. As gallium generated from the germanium decays relatively rapidly to zinc, there is a limit to the amount of zinc that can accumulate on the sorbent. The inventor has found that if a relatively large amount of purified $^{68}$Ga is required, it is more effective to allow only partial build-up of the gallium on the sorbent to occur, commonly about 50% of the maximum, before milking the gallium from the sorbent, and to repeat this several times. This can result in a more satisfactory $^{68}$Ga/$^{68}$Zn ratio and higher overall $^{68}$Ga radioactivity. As the time required to reach 50% of the maximum amount of $^{68}$Ga is about 1.123 hours, this is a suitable period to wait between subsequent elutions of the sorbent. Suitable times are, more broadly, in the range of about 50 to about 75 minutes, or about 50 to 70, 50 to 65, 50 to 60, 55 to 75, 60 to 75, 65 to 75, 60 to 70 or 65 to 75 minutes, e.g. about 50, 55, 60, 65, 66, 67, 68, 69, 70 or 75 minutes.

Example 1

ZT-11 Sorbent

This example relates to a preparation process of inorganic polymer sorbent ZT-11 based on mixed Zr and Ti metal oxide. The name of the sorbent is implied as follows: Z [zirconium], T [titanium], 11 [mole ratio 1:1].

The first step of the preparation process is the chemical synthesis of the solid gel materials from a reaction mixture of reactants $TiCl_4$, $ZrCl_4$, and iPrOH. The reactants and reaction condition are described in Table 1-1. The preparation process was as follows:

i. a reactant mixture was prepared with the following given reactant amounts:
   0.5 mol $ZrCl_4$+0.5 mol $TiCl_4$+400 mL iPrOH
   by adding the required amount of solid $ZrCl_4$ material to the required amount of liquid $TiCl_4$ which was premixed with 400 mL iPrOH. An exothermal chemical reaction started immediately to raise temperature of the reaction mixture to 90° C. by the end of the reactant addition.

ii. the condensation reaction of the reactants $TiCl_4$, $ZrCl_4$, and iPrOH was allowed to proceed under the following heating temperature scheme:
   the temperature of the reaction mixture was kept at 90° C. for 4 hours to obtain a viscous solution,
   the viscous solution was further heated at 115° C. to obtain a water-soluble sticky soft gel (the intermediate precursor) which was quickly formed at this temperature,
   the water-soluble sticky soft gel was further heated at 130° C. for 45 minutes to obtain a water-insoluble, solid polymer gel material in powder form of particle sizes from 0.10 mm to 0.01 mm.

iii. the solid polymer gel powder was left to cool at room temperature overnight before commencing a further chemical treatment.

The appearance of the solid polymer gel powder varied from opaque white to light yellow-brown in colour. Its appearance changed to white when soaked in water. It swelled well in water and gives an acidic solution in contact with water.

Figure 1B:
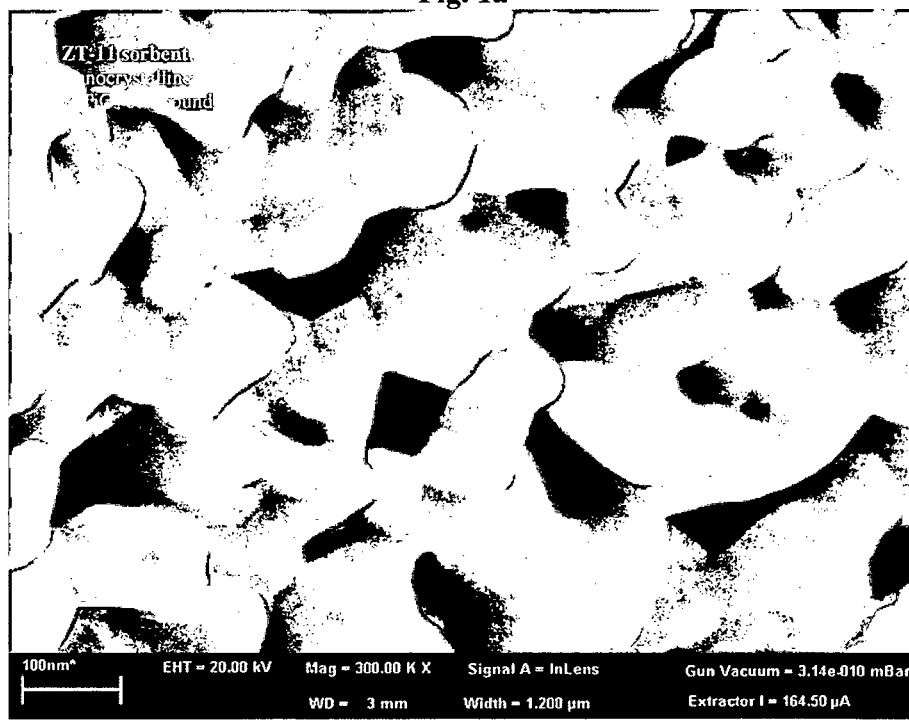
Figure 2:
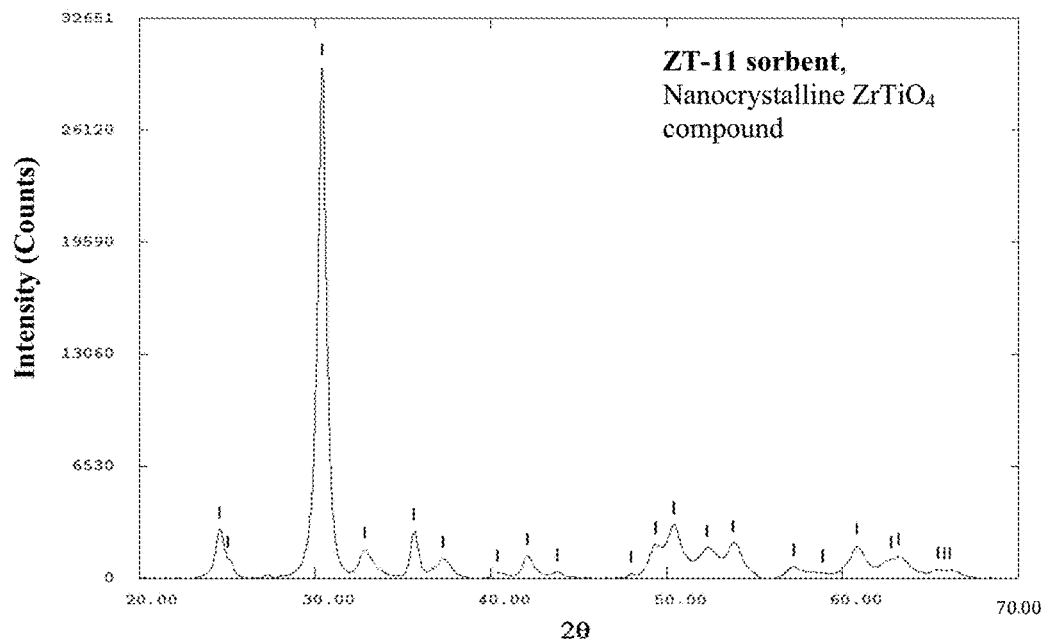
FIG. 2: X-ray powder diffraction pattern of the ZT-11 sorbent sample.

The next step of the preparation process was a chemical treatment of the solid polymer gel powder. The chemical treatment is described in Table 1-2 and comprised:

i. soaking the solid polymer gel powder in an alkali solution which contained oxidizing agent NaOCl. 122 g solid polymer gel powder obtained in the first step was mixed with 1159 mL 0.5 M NaOH solution containing 1% (by weight) NaOCl.
ii. gently shaking the solid gel powder/solution mixture with a mechanical shaker for at least 4 hours so as to convert a gel structure solid powder to a macroporous solid powder and to convert any lower valence metallic ions to its original 4+ valence. The required volume of the solution per gram solid gel powder was determined so as the pH of solution at the end of process should be kept between 2 and 5.
iii. decanting the clear solution or removing solid content by filtering through a sintered glass filter. The solid content was washed several times with bidistilled water so as to remove all dissolved sodium and chloride ions.
iv. drying the solid content at 80° C. to dryness for 3 hours so as to obtain a white hydrated solid powder of the sorbent ZT-11.

i. Properties of the final product are shown in Table 1-3. The partial fusion is thought to cross-linked the nano-particles to create a hard porous matrix of sorbent ZT-11 as shown in FIGS. 1a and 1b. The high chemical and mechanical stability provided by the stable crystalline mono phase and cross linking matrix of the sorbent ZT-11 as shown in FIG. 2 and FIG. 1b, respectively. A stable crystalline monophase of ZT-11 sorbent with a chemical formula $ZrTiO_4$ is demonstrated by the X-ray powder diffraction pattern and parameters shown in FIG. 2 and Table 2, respectively.
ii. Sieving the resulting hard solid powders to remove very fine particles and collect a fraction of particle size suitable for a chromatographic column packing. As example a fraction of particle size between 50 micron to 100 micron was collected to be used as a sorbent for chromatographic column packing applied for chemical separation processes, particularly for the $^{68}Ga$ generator production.

TABLE 1-1

Reaction conditions for the synthesis of sorbent ZT-11 and characterization in the first step of preparation process

| $ZrCl_4$ weight, (g) | $TiCl_4$ weight, (g) | Volume of iPrOH, (mL) | Reaction temperature scheme | Particle size of solid gel material, (precursor of ZT-11) (mm) | Chlorine content in solid gel material, (millimol Cl/g gel) | Swelling in $H_2O$, (% volume) | Weight of obtained solid gel material (precursor of ZT-11), g |
|---|---|---|---|---|---|---|---|
| 116.51 | 94.84 | 400 | At 90° C. for 4 hours → at 115° C. for about 2 minutes → at 130° C. for 45 minutes | 0.1-0.01 | 4.75 | 26.1 | 122 |

TABLE 1-2

Treatment conditions in the second step of preparation process of sorbent ZT-11

| Weight of solid gel material (precursor of ZT-11) obtained from first step, (g) | Volume of 0.5M HCl solution containing 1% NaClO, (mL) | Treatment time, (hour) | pH of solution at the end of the chemical treatment | Chemical treatment temperature | Drying the solid content obtained from chemical treatment | Weight of white hydrated solid powder of the sorbent ZT-11 after drying solid content, (g) |
|---|---|---|---|---|---|---|
| 122 | 1159 | 4 | 3 | Room temperature | 80° C. for 3 hours | 101.0 |

In the final step of the preparation process the white hydrated solid powder of the sorbent ZT-11 obtained as described above was sintered to obtain the final product of the sorbent ZT-11. This sintering process comprised:

Heating the white hydrated solid powder of the sorbent ZT-11 at 700° C. in a furnace for 3 hours so as to obtain a crystalline structure hard solid powder of sorbent ZT-11. This step allowed the semicrystalline nano-particles to perfectly crystallize and subsequently to melt and partially fuse to form the particles of the sorbent.

TABLE 1-3

Characterization of sorbent ZT-11

| Chemical formula | Structure | Particle size, μm | Porosity, nm | $^{68}Ge$ adsorption capacity, mg/g |
|---|---|---|---|---|
| $ZrTiO_4$ | Crystalline mono phase | 50-100 | <100 | 1.3 |

TABLE 2

X-ray powder diffraction data for characterization of the sorbent ZT-11

| 2Theta | d (A) | Height | Area | FWHM |
|---|---|---|---|---|
| 24.629 | 3.61177 | 2870.4 | 40123.9 | 0.4679 |
| 25.097 | 3.54547 | 1150.1 | 8294.4 | 0.2674 |
| 30.414 | 2.93662 | 29802.8 | 415557.4 | 0.4679 |
| 32.836 | 2.72531 | 1669.0 | 31580.1 | 0.6350 |
| 35.642 | 2.51695 | 2756.1 | 38582.3 | 0.4679 |
| 37.353 | 2.40548 | 1140.6 | 26233.4 | 0.7687 |
| 40.405 | 2.23055 | 345.3 | 4757.6 | 0.4679 |
| 42.102 | 2.14447 | 1325.7 | 21204.0 | 0.5348 |
| 43.788 | 2.06576 | 392.9 | 7067.6 | 0.6016 |
| 47.992 | 1.89415 | 303.7 | 3329.0 | 0.3676 |
| 49.359 | 1.84483 | 1984.6 | 31108.6 | 0.5348 |
| 50.404 | 1.80900 | 3120.9 | 56141.6 | 0.6016 |
| 52.311 | 1.74746 | 1801.7 | 42667.9 | 0.8021 |
| 53.831 | 1.70167 | 2077.3 | 47776.7 | 0.7687 |
| 57.245 | 1.60801 | 671.6 | 13428.2 | 0.6684 |
| 58.904 | 1.56663 | 336.8 | 2357.1 | 0.2340 |
| 60.846 | 1.52118 | 1896.9 | 36041.7 | 0.6350 |
| 62.793 | 1.47863 | 1117.4 | 17366.7 | 0.5348 |
| 63.192 | 1.47024 | 1288.0 | 29567.8 | 0.7687 |
| 65.412 | 1.42561 | 512.2 | 8052.4 | 0.5348 |
| 66.116 | 1.41212 | 485.6 | 10678.6 | 0.7353 |
| 65.784 | 1.41844 | 478.1 | 8276.5 | 0.7353 |

Example 2

ZT-31 Sorbent

This example relates to preparation inorganic polymer sorbent ZT-31 based on mixed Zr and Ti metal oxide. In accordance with the nomenclature described in Example 1, this sorbent has zirconium and titanium in a mol ratio of Zr/Ti=3/1.

In the first step of the preparation process provided herein for obtaining sorbent ZT-31 is the chemical synthesis of the solid gel materials from a reaction mixture of reactants $TiCl_4$, $ZrCl_4$, and iPrOH. The reactants and reaction condition are described in Table 3-1.

The preparation process was similar to the process of Example 1, with the following variations:
i. the reactant mixture had the following given reactant amounts:
0.75 mol $ZrCl_4$+0.25 mol $TiCl_4$+400 mL iPrOH.
The exothermal chemical reaction raised the temperature of the reaction mixture to 92° C. at the end of the reactant addition.
ii. the temperature of reaction mixture was kept at 92° C. for 4 hours to obtain a viscous solution, which was heated to 120° C. to obtain a water-soluble sticky soft gel (the intermediate precursor). This was then heated at 135° C. for 45 minutes to obtain a water-insoluble, solid polymer gel material in powder form.
iii. leaving the solid polymer gel powder to cool at room temperature overnight before starting a further chemical treatment.

The next step is described in Table 3-2 and is similar to the corresponding step in Example 1 except that 133.12 g of the solid polymer gel powder obtained in the first step was mixed with 1159 mL of the alkaline oxidant solution.

Figure 4A:
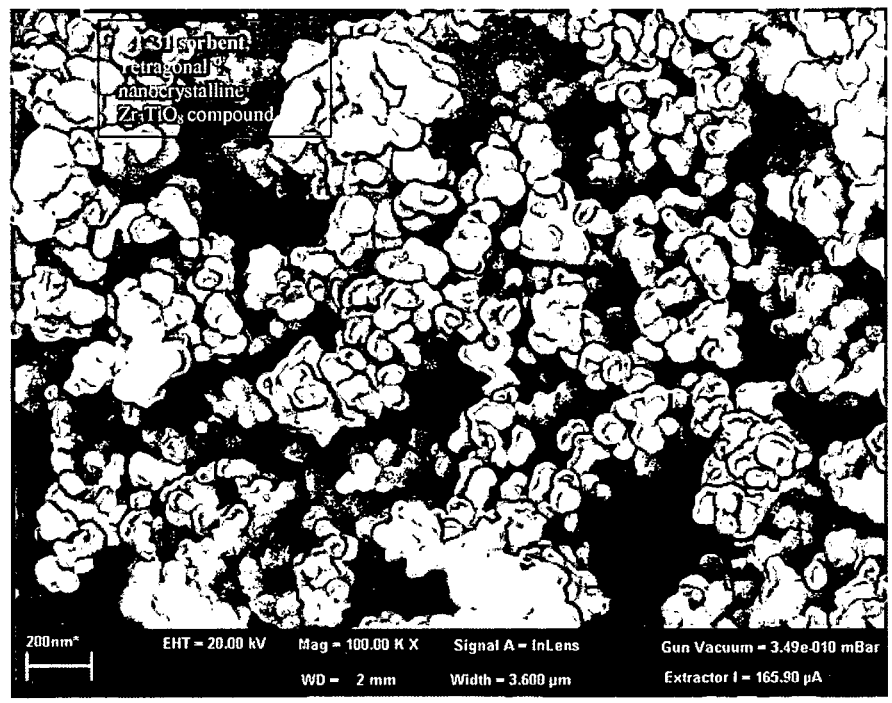
FIG. 4: Scanning electron microscope (SEM) images of the ZT-31 sorbent sample at different resolutions (a: 100,000×; b: 300,000×).
Figure 4B:
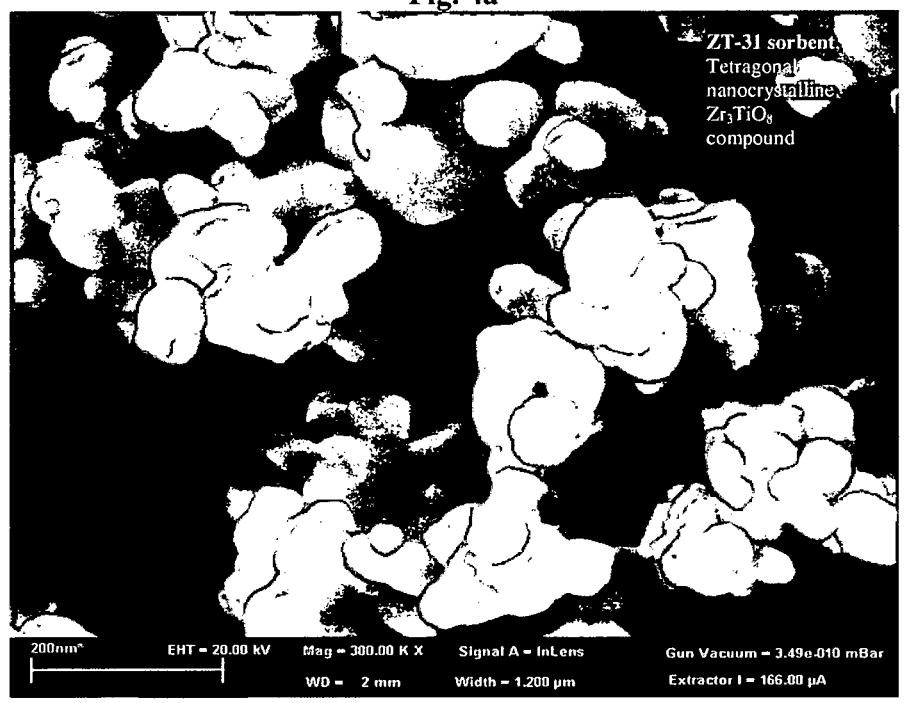
Figure 5:
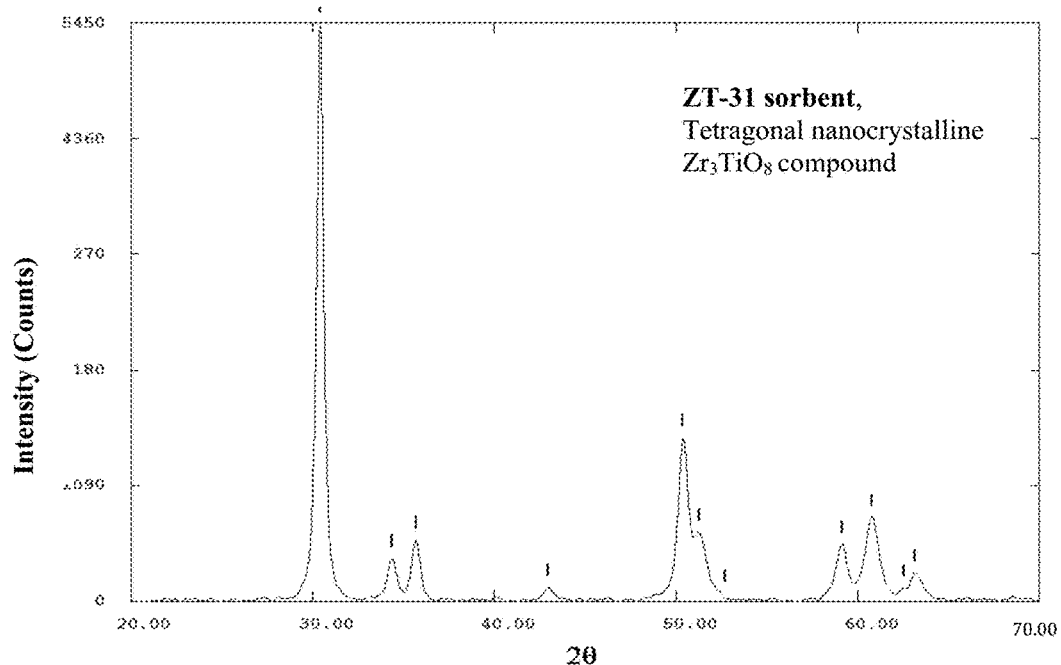
FIG. 5: X-ray powder diffraction pattern of the ZT-31 sorbent sample.

The final of the preparation process of sorbent ZT-31 was the same as described in Example 1 for ZT-11, except that sintering was conducted at 900° C. Micrographs of sorbent ZT-31 are shown in FIGS. 4a and 4b, properties are shown in Table 3-3 and an X-ray powder diffraction pattern of ZT-31 is shown in FIG. 5 (and data in Table 4).

TABLE 3-1

Reaction conditions for the synthesis of sorbent ZT-31 and its characterizations in the first step of preparation process

| $ZrCl_4$ weight, (g) | $TiCl_4$ weight, (g) | Volume of iPrOH, (mL) | Reaction temperature scheme | Particle size of solid gel material, (precursor of ZT-31) (mm) | Chlorine content in solid gel material, (millimol Cl/g gel) | Swelling in $H_2O$, (% volume) | Weight of obtained solid gel material (precursor of ZT-31), g |
|---|---|---|---|---|---|---|---|
| 174.76 | 23.71 | 400 | At 92° C. for 4 hours → at 120° C. for about 2 minutes → at 135° C. for 45 minutes | 0.1-0.01 | 4.36 | 23.5 | 133.12 |

TABLE 3-2

Treatment conditions in the second step of preparation process of sorbent ZT-31

| Weight of solid gel material (precursor of ZT-31) obtained from the first step, (g) | Volume of 0.5M HCl solution containing 1% NaClO, (mL) | Treatment time, (hour) | pH of solution at the end of the chemical treatment | Chemical treatment temperature | Drying the solid content obtained from chemical treatment | Weight of white hydrated solid powder of sorbent ZT-31 after drying solid content, (g) |
|---|---|---|---|---|---|---|
| 133.12 | 1159 | 4 | 3 | Room temperature | 80° C. for 3 hours | 112.4 |

TABLE 3-3

Characterization of sorbent ZT-31

| Chemical formula | Structure | Particle size, μm | Porosity, nm | $^{68}Ge$ adsorption capacity, mg/g |
|---|---|---|---|---|
| $Zr_3TiO_8$ | Crystalline mono phase | 50-100 | <100 | 1.5 |

TABLE 4

X-ray powder diffraction data for characterization of the sorbent ZT-31

| 2Theta | d (A) | Height | Area | FWHM |
|---|---|---|---|---|
| 30.428 | 2.93527 | 5451.1 | 65403.3 | 0.4011 |
| 34.364 | 2.60757 | 406.7 | 6094.2 | 0.5013 |
| 35.678 | 2.51449 | 577.8 | 8667.1 | 0.5013 |
| 42.954 | 2.10392 | 133.9 | 1998.2 | 0.5013 |
| 50.382 | 1.80976 | 1543.3 | 23149.0 | 0.5013 |
| 51.245 | 1.78127 | 650.9 | 10846.5 | 0.5682 |
| 52.721 | 1.73484 | 77.1 | 579.2 | 0.2340 |
| 59.132 | 1.56113 | 538.8 | 9694.4 | 0.6016 |
| 60.787 | 1.52253 | 794.9 | 16650.0 | 0.7019 |
| 62.557 | 1.48363 | 124.9 | 1071.7 | 0.3008 |
| 63.148 | 1.47116 | 271.0 | 4856.3 | 0.6016 |

Example 3

ZiSORB Sorbent

This example relates to preparation of inorganic polymer sorbent ZiSORB based on a single metal oxide-zirconium oxide.

The reactants and reaction condition used in the first step are described in Table 5-1. They are the same as those described in Example 1 with the following exceptions:

i. the reactant mixture contained 1.0 mol $ZrCl_4$+400 mL iPrOH. The exothermal chemical reaction raised the reaction mixture to 93° C. at the end of the reactant addition.

ii. the reaction mixture was kept at 93° C. for 4 hours to obtain a viscous solution, which was then heated at 125° C. to obtain a water-soluble sticky soft gel (the intermediate precursor). This was then heated at 140° C. for 45 minutes to obtain the water-insoluble, solid polymer gel.

The next step is described in Table 5-2 and was as described in Example 1 with the exception that 144.0 g of the solid polymer gel powder was treated with 1159 ml of the alkaline oxidant solution.

Figure 7:
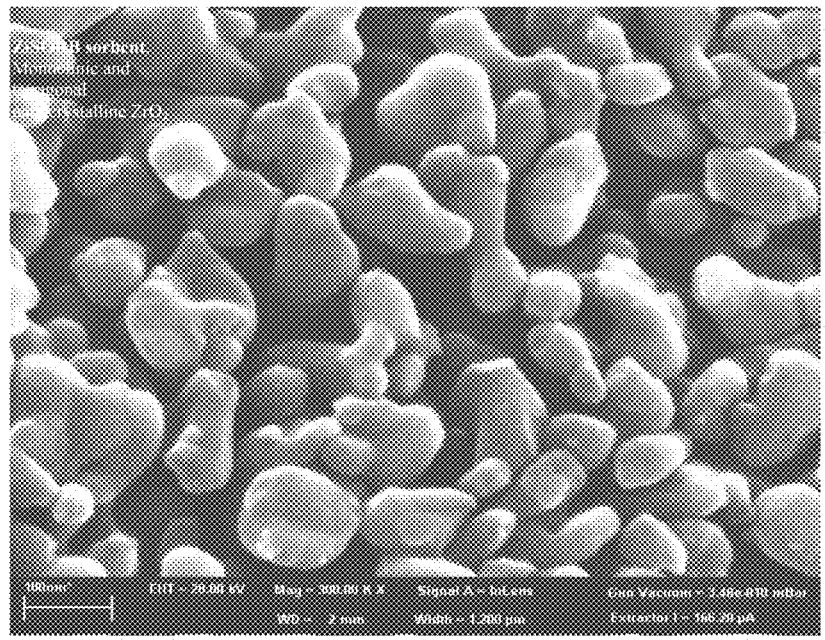
FIG. 7: Scanning electron microscope (SEM) image of the ZiSORB sorbent sample.
Figure 8:
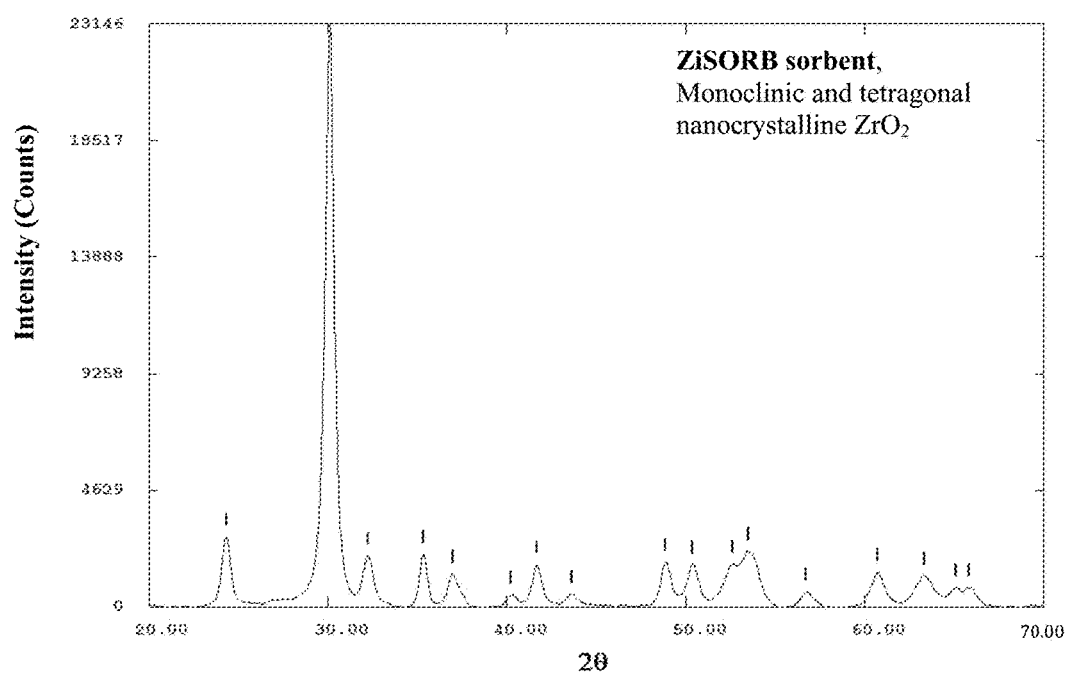
FIG. 8: X-ray powder diffraction pattern of the ZiSORB sorbent sample.

The final step of the preparation process of sorbent ZiSORB was the same as described in Example 1 for ZT-11, except that sintering was conducted at 900° C. A micrographs of sorbent ZiSORB is shown in FIG. 7 and an X-ray powder diffraction pattern of ZiSORB is shown in FIG. 8 with data shown in Table 6.

TABLE 5-1

Reaction conditions for the synthesis of sorbent ZiSORB and its characterization in the first step of preparation process

| $ZrCl_4$ weight, (g) | Volume of iPrOH, (mL) | Reaction temperature scheme | Particle size of solid gel material (precursor of ZiSORB) (mm) | Chlorine content in solid gel material, (millimol Cl/g gel) | Swelling in $H_2O$, (% volume) | Weight of obtained solid gel material (precursor of ZiSORB), g |
|---|---|---|---|---|---|---|
| 233.02 | 400 | At 93° C. for 4 hours → at 125° C. for about 2 minutes → at 140° C. for 45 minutes | 0.1-0.01 | 4.14 | 27.2 | 144.0 |

TABLE 5-2

Treatment conditions in the second step of preparation process of sorbent ZiSORB

| Weight of solid gel material (precursor of ZiSORB) obtained from the first step, (g) | Volume of 0.5M HCl solution containing 1% NaClO, (mL) | Treatment time, (hour) | pH of solution at the end of the chemical treatment | Chemical treatment temperature | Drying the solid content obtained from chemical treatment | Weight of white hydrated solid powder of the sorbent ZiSORB after drying solid content (g) |
|---|---|---|---|---|---|---|
| 144.0 | 1159 | 4 | 3 | Room temperature | 80° C. for 3 hours | 123.0 |

TABLE 5-3

Characterization of sorbent ZiSORB

| Chemical formula | Structure | Particle size, μm | Porosity, nm | $^{68}Ge$ adsorption capacity, mg/g |
|---|---|---|---|---|
| $ZrO_2$ | Nanocrystalline | 50-100 | <100 | 1.0 |

TABLE 6

X-ray powder diffraction data for characterization of the sorbent ZiSORB

| 2Theta | d (A) | Height | Area | FWHM |
|---|---|---|---|---|
| 24.350 | 3.65244 | 2757.6 | 44119.0 | 0.5348 |
| 30.115 | 2.96509 | 23219.0 | 347201.9 | 0.5013 |
| 32.239 | 2.77443 | 2031.9 | 34540.1 | 0.5682 |
| 35.337 | 2.53799 | 2091.8 | 31357.2 | 0.5013 |
| 36.960 | 2.43017 | 1321.5 | 20858.6 | 0.5348 |
| 40.267 | 2.23790 | 477.7 | 9938.3 | 0.7019 |
| 41.686 | 2.16493 | 1659.5 | 26536.8 | 0.5348 |
| 43.610 | 2.07378 | 513.5 | 7696.3 | 0.5013 |
| 48.869 | 1.86220 | 1797.9 | 30465.4 | 0.5682 |
| 50.374 | 1.81003 | 1691.5 | 32120.8 | 0.6350 |
| 52.588 | 1.73891 | 1705.3 | 26707.0 | 0.5348 |
| 53.505 | 1.71126 | 2220.8 | 59942.6 | 0.9024 |
| 56.706 | 1.62202 | 608.8 | 10349.0 | 0.5682 |
| 60.707 | 1.52435 | 1361.9 | 28596.7 | 0.7019 |
| 63.289 | 1.46822 | 1243.5 | 37303.2 | 1.0027 |
| 65.073 | 1.43222 | 769.3 | 10760.0 | 0.4679 |
| 65.815 | 1.41786 | 770.9 | 13660.8 | 0.6016 |

Example 4

TiSORB Sorbent

This example relates to a preparation process of inorganic polymer sorbent TiSORB based titanium oxide.

The reactants and reaction conditions used in the first step are described in Table 7-1. They are the same as those described in Example 3 with the following exceptions:

i. preparing the reactant mixture with the following given reactant amounts 1.0 mol $TiCl_4$ was used in place of 1.0 mol $ZrCl_4$. The exothermal chemical reaction raised the reaction mixture to 90° C. at the end of the reactant addition.

ii. The reaction mixture was kept at 90° C. for 4 hours to obtain a viscous solution, which was then heated at 115° C. to obtain the water-soluble sticky soft-gel (the intermediate precursor). This was then heated at 125° C. for 45 minutes to obtain a water-insoluble, solid polymer gel.

The next step is described in Table 7-2 and is as described in Example 3 with the exception 100.0 g solid polymer gel powder was mixed with 1159 mL of the alkaline oxidant solution.

Figure 9:
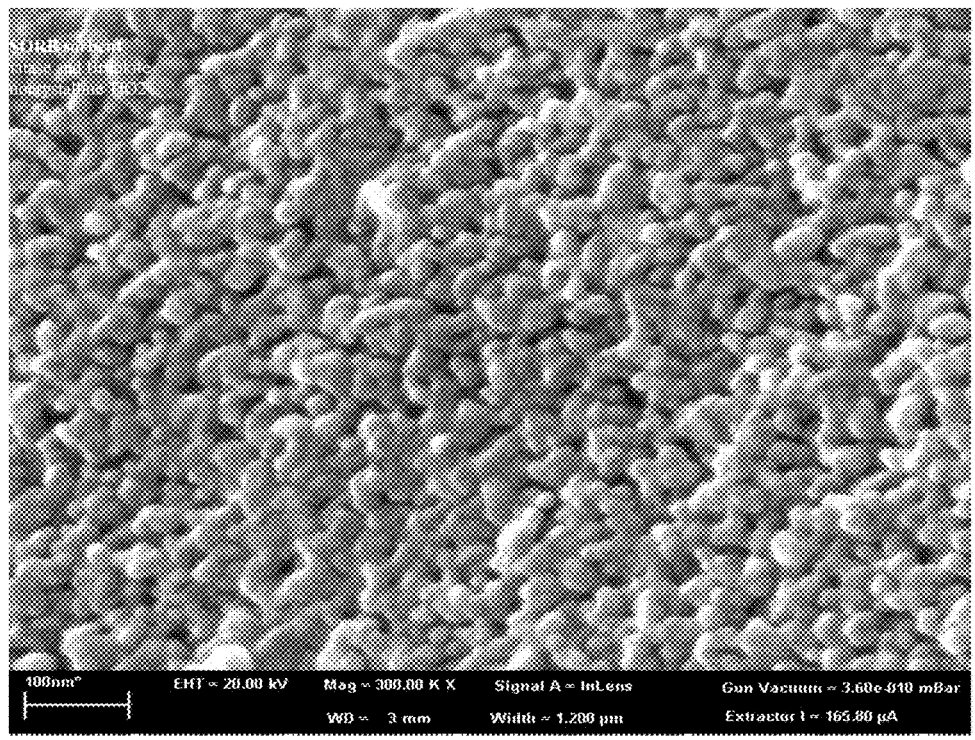
FIG. 9: Scanning electron microscope (SEM) image of the TiSORB sorbent sample.
Figure 10:
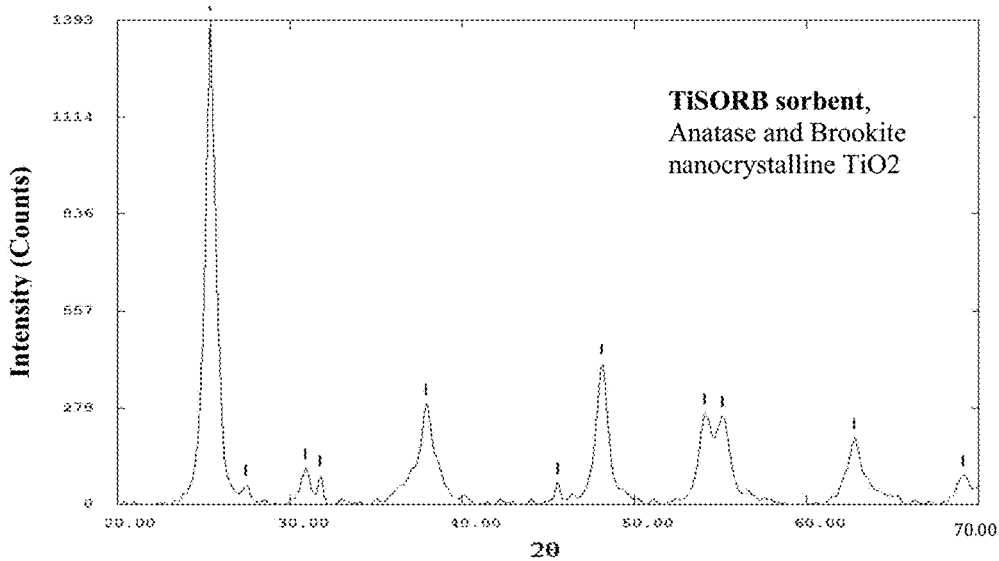
FIG. 10: X-ray powder diffraction pattern of the TiSORB sorbent sample.

In the final step was the same as described in Example 3 for ZiSORB except that sintering was conducted at 500° C. A micrograph of sorbent TiSORB is shown in FIG. 9 and an X-ray powder diffraction pattern and parameters are shown in FIG. 10 and Table 8, respectively.

TABLE 7-1

Reaction conditions for the synthesis of sorbent TiSORB and its characterizations in the first step of preparation process

| $TiCl_4$ weight (g) | Volume of iPrOH (mL) | Reaction temperature scheme | Particle size of solid gel material (precursor of TiSORB) (mm) | Chlorine content in solid gel material, (millimol Cl/g gel) | Swelling in $H_2O$, (% volume) | Weight of obtained solid gel material (precursor of TiSORB) g |
|---|---|---|---|---|---|---|
| 189.68 | 400 | At 90° C. for 4 hours → at 115° C. for about 2 minutes → at 125° C. for 45 minutes | 0.1-0.01 | 5.80 | 26.2 | 100.0 |

TABLE 7-2

Treatment conditions in the second step of preparation process of sorbent TiSORB

| Weight of solid gel material (precursor of TiSORB) obtained from the first step (g) | Volume of 0.5M HCl solution containing 1% NaClO, (mL) | Treatment time (hour) | pH of solution at the end of the chemical treatment | Chemical treatment temperature | Drying the solid content obtained from chemical treatment | Weight of white hydrated solid powder of the sorbent TiSORB after drying solid content (g) |
|---|---|---|---|---|---|---|
| 100.0 | 1159 | 4 | 3 | Room temperature | 80° C. for 3 hours | 80.0 |

TABLE 7-3

Characterization of sorbent TiSORB

| Chemical formula | Structure | Particle size, μm | Porosity, nm | $^{68}$Ge adsorption capacity, mg/g |
|---|---|---|---|---|
| $TiO_2$ | Nanocrystalline, anatase | 50-100 | <100 | 1.0 |

TABLE 8

X-ray powder diffraction data for characterization of the sorbent TiSORB

| 2Theta | d (A) | Height | Area | FWHM |
|---|---|---|---|---|
| 25.393 | 3.50482 | 1395.3 | 31708.3 | 0.7687 |
| 27.474 | 3.24381 | 57.5 | 1031.8 | 0.6016 |
| 30.925 | 2.88929 | 103.9 | 1859.3 | 0.6016 |
| 31.770 | 2.81430 | 84.3 | 1316.8 | 0.5348 |
| 37.951 | 2.36898 | 289.8 | 6084.8 | 0.7019 |
| 45.540 | 1.99026 | 62.9 | 1068.6 | 0.5682 |
| 48.109 | 1.88980 | 406.0 | 9337.6 | 0.7687 |
| 54.133 | 1.69289 | 262.6 | 5485.5 | 0.7019 |
| 55.120 | 1.66487 | 255.8 | 5505.7 | 0.7353 |
| 62.779 | 1.47893 | 192.5 | 4234.9 | 0.7353 |
| 69.079 | 1.35861 | 85.2 | 1859.7 | 0.7353 |

Example 5

SnSORB Sorbent

This example relates to a preparation process of inorganic polymer sorbent SnSORB based on tin oxide.

The reactants and reaction condition used in the first step are described in Table 9-1. They are the same as those described in Example 3 with the following exceptions:

i. preparing the reactant mixture with the following given reactant amounts 1.0 mol $SnCl_4$ was used in place of 1.0 mol $ZrCl_4$. The exothermal chemical reaction raised the reaction mixture to 90° C. at the end of the reactant addition.

iii. The reaction mixture was kept at 90° C. for 4 hours to obtain a viscous solution, which was then heated at 115° C. to obtain the water-soluble sticky soft gel (the intermediate precursor). This was then heated at 125° C. for 45 minutes to obtain a water-insoluble, solid polymer gel.

The next step is described in Table 9-2 and is as described in Example 3 except that 171.4 g solid polymer gel powder was mixed with 1159 mL of the alkaline oxidant solution.

Figure 11:
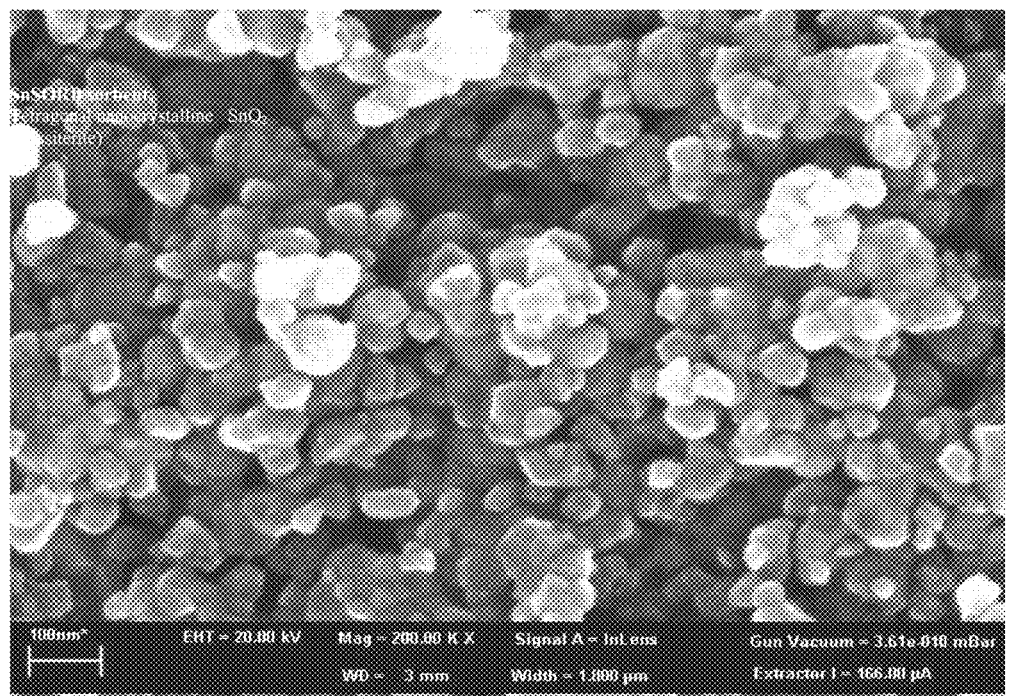
FIG. 11: Scanning electron microscope (SEM) image of the SnSORB sorbent sample.
Figure 12:
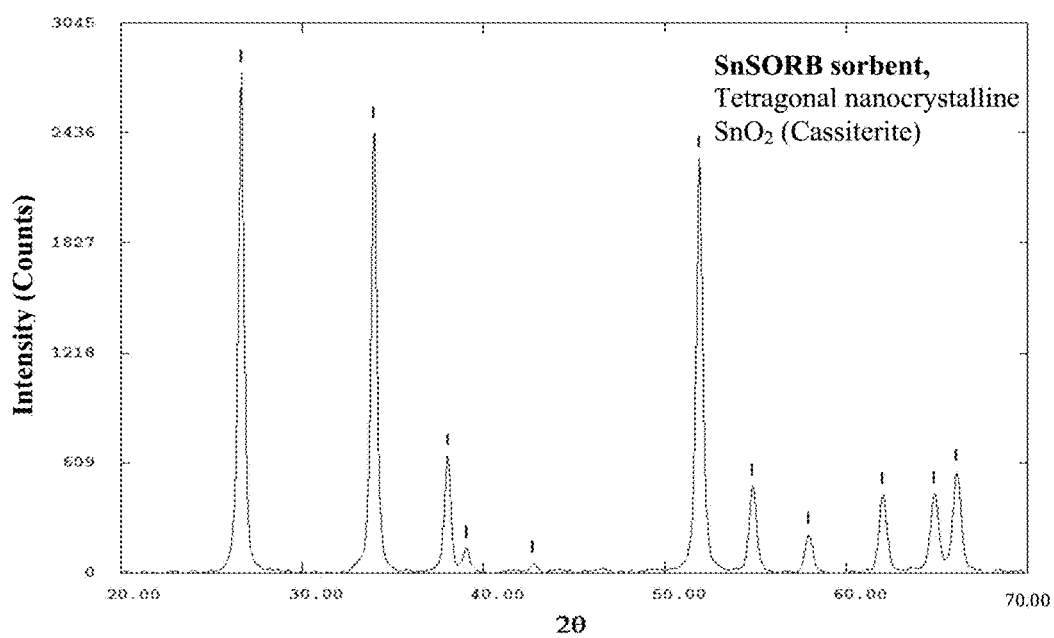
FIG. 12: X-ray powder diffraction pattern of the SnSORB sorbent sample.

In the final step was the same as described in Example 3 for ZiSORB. A micrograph of sorbent SnSORB is shown in FIG. 11 and an X-ray powder diffraction pattern and parameters are shown in FIG. 12 and Table 10, respectively.

TABLE 9-1

Reaction conditions for the synthesis of sorbent SnSORB and its characterization in the first step of preparation process

| $SnCl_4$ weight (g) | Volume of iPrOH (mL) | Reaction temperature scheme | Particle size of solid gel material (precursor of SnSORB) (mm) | Chlorine content in solid gel material, (millimol Cl/g gel) | Swelling in $H_2O$, (% volume) | Weight of obtained solid gel material (precursor of SnSORB), g |
|---|---|---|---|---|---|---|
| 260.51 | 400 | At 90° C. for 4 hours → at 115° C. for about 2 minutes → at 125° C. for 45 minutes | 0.1-0.01 | 3.38 | 25.2 | 171.4 |

TABLE 9-2

Treatment conditions in the second step of preparation process of sorbent SnSORB

| Weight of solid gel material (precursor of SnSORB) obtained from the first step (g) | Volume of 0.5M HCl solution containing 1% NaClO, (mL) | Treatment time, (hour) | pH of solution at the end of the chemical treatment | Chemical treatment temperature | Drying the solid content obtained from chemical treatment | Weight of white hydrated solid powder of the sorbent SnSORB after drying solid content (g) |
|---|---|---|---|---|---|---|
| 171.4 | 1159 | 4 | 3 | Room temperature | 80° C. for 3 hours | 150.7 |

TABLE 9-3

Characterization of sorbent SnSORB

| Chemical formula | Structure | Particle size, μm | Porosity, nm | $^{68}$Ge adsorption capacity, mg/g |
|---|---|---|---|---|
| SnO$_2$ | Nanocrystalline | 50-100 | <100 | 1.0 |

TABLE 10

X-ray powder diffraction data for characterization of the sorbent SnSORB

| 2Theta | d (A) | Height | Area | FWHM |
|---|---|---|---|---|
| 26.661 | 3.34083 | 2773.6 | 30455.0 | 0.3676 |
| 33.959 | 2.63773 | 2454.8 | 26830.1 | 0.3676 |
| 38.040 | 2.36361 | 648.0 | 7758.6 | 0.4011 |
| 39.064 | 2.30401 | 136.9 | 1777.5 | 0.4345 |
| 42.750 | 2.11348 | 54.6 | 705.4 | 0.4345 |
| 51.885 | 1.76082 | 2295.0 | 27530.3 | 0.4011 |
| 54.853 | 1.67234 | 481.1 | 6247.0 | 0.4345 |
| 57.937 | 1.59045 | 211.0 | 2954.3 | 0.4679 |
| 61.995 | 1.49573 | 432.8 | 6046.6 | 0.4679 |
| 64.843 | 1.43674 | 439.9 | 6146.1 | 0.4679 |
| 66.069 | 1.41302 | 560.5 | 8399.1 | 0.5013 |

Example 6

Figure 3:
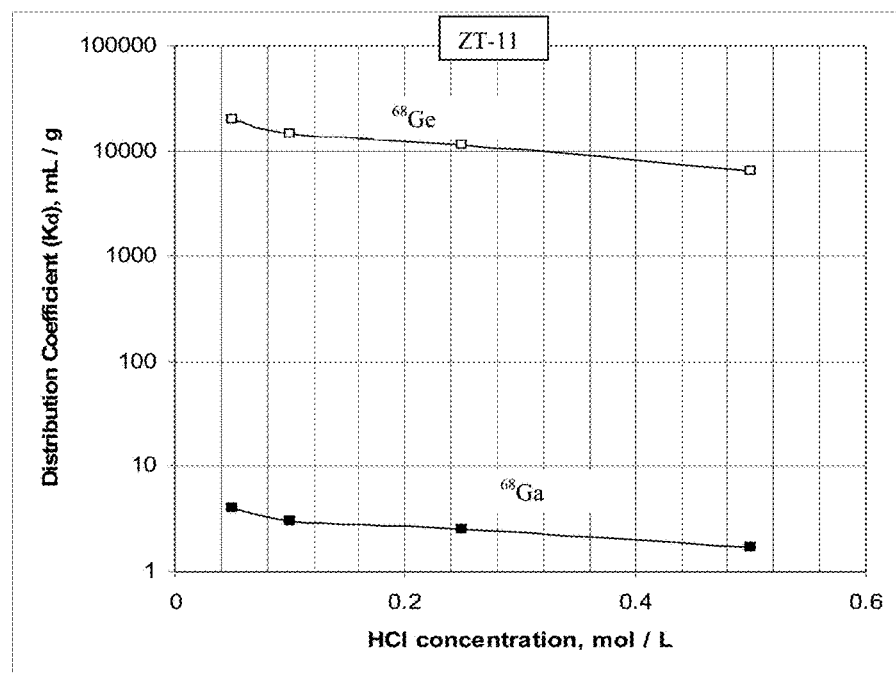
FIG. 3: Graph of distribution coefficient (Kd) of $^{68}$Ge and $^{68}$Ga ions for the ZT-11 sorbent as a function of HCl concentration.
Figure 6:
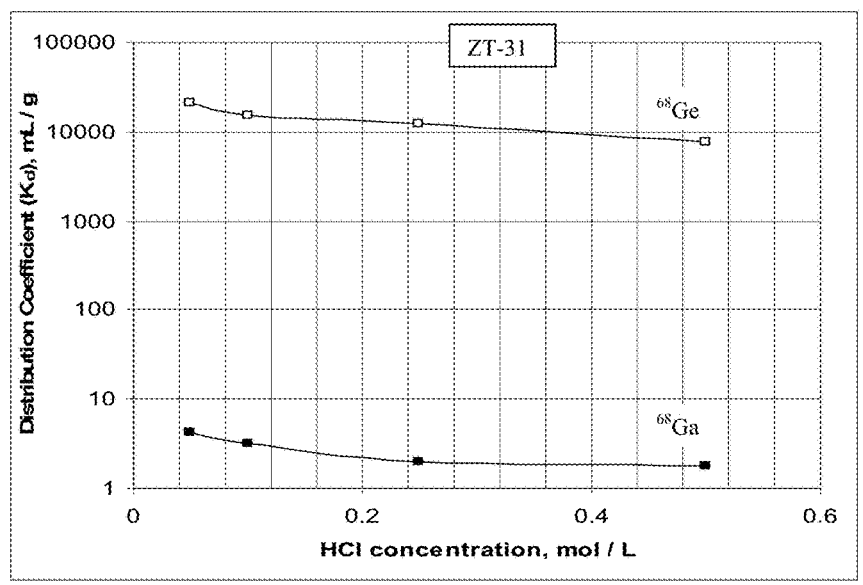
FIG. 6: Graph of distribution coefficient (Kd) of $^{68}$Ge and $^{68}$Ga ions for the ZT-31 sorbent as a function of HCl concentration.
Figure 14:
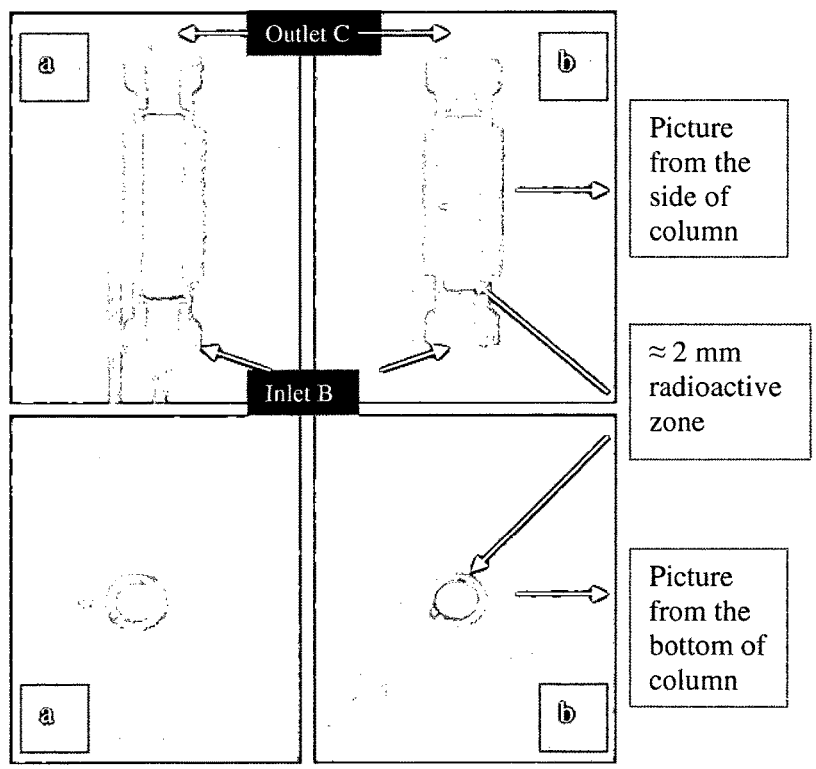
FIG. 14: Picture imaged by the CT-combined $^{68}$Ga-based PET imaging technique from a ZT-11 sorbent based $^{68}$Ga generator column (a) before and (b) after a one-year operation ($^{69}$Ga elution).

This example of the present invention relates to a $^{68}$Ga generator based on an inorganic polymer sorbent ZT-11 or ZT-31, described in Examples 1 and 2 respectively. The generator column is a chromatographic column packed with sorbent ZT-11 or ZT-31, which are mixed metal oxide of zirconium and titanium of molar metal element mol ratio Zr/Ti=0.5 or Zr/Ti=0.75 respectively. These sorbents are in solid particulate form, so that the sorbent column contains a packed bed of the particulate sorbent. The sorbent particles are physically stable, so that the integrity of the sorbent is maintained during operation of the sorbent column without blockage. As shown in FIGS. 3 and 6, the sorbents ZT-11 and ZT-31 have a much higher affinity for $^{68}$Ge than for $^{68}$Ga so that $^{68}$Ga is preferentially eluted from the sorbent while the majority, preferably substantially all, of the $^{68}$Ge is retained on the sorbent. The Kd values presented in FIGS. 3 and 6 are the measures of adsorption affinity of metal ions on the sorbent. The Kd values of $^{68}$Ge and $^{68}$Ga are >10$^4$ and about 2, respectively, for both ZT-11 and ZT-31 sorbents. Typically both the sorbents ZT-11 and ZT-31 are such that the % breakthrough of $^{68}$Ge is less than about 10$^{-3}$ or 5*10$^{-4}$. The sorbent is resistant to radiation. This feature is important since the $^{68}$Ge typically resides on the column for a period longer than 2 years. The sorbents ZT-11 and ZT-31 are macroporous/mesoporous. Pore size as low as about 100 nm shown in FIGS. 1a,b and 4a,b are obtained to facilitate the Ga$^{3+}$ and Ge$^{4+}$ ions' diffusion. The Ge adsorption capacity of sorbents ZT-11 and ZT-31 sufficiently high, commonly greater than 1 mg Ge per gram sorbent (see for example Table 3-3), that a high $^{68}$Ga radioactivity generator may be prepared based on these sorbents. Typically a generator column of several hundreds mCi $^{68}$Ga may be prepared from 1.0 g weight sorbent ZT-11 or ZT-31. The sorbents are chemically stable in HCl solution eluents having a wide range of concentrations. Typically these sorbents are stable in HCl solution of up to 3 M HCl. A typical sorbent column contains 1.0 g ZT-11 or ZT-31 sorbent. The stability of the sorbent column ZT-11 is shown in FIG. 14. The photographs of FIG. 14 were imaged by a CT-combined $^{68}$Ga-based PET imaging technique and show a ZT-11 sorbent based $^{68}$Ga generator column before (a) and after (b) an one year operation ($^{68}$Ga elution). As shown, the small radioactive zone of $^{68}$Ge was still firmly retained in a band of about 2 mm at the bottom of the ZT-11 sorbent bed of the column without significant movement after such a long period of operation (the eluent flows from the bottom of the column to the top of the column).

Applying the Stock Acidic $^{68}$Ge Solution to a Sorbent Column.

Before loading with $^{68}$Ge solution, the sorbent column was washed with about 30 mL 1M HCl solution. The stock acidic $^{68}$Ge solution was a 0.1 M HCl $^{68}$Ge solution. $^{68}$Ge concentration was about 1-15 mCi/mL, e.g. about 12.5 mCi $^{68}$Ge/mL. The $^{68}$Ge solution volume applied to each sorbent column was about 2-15 mL. The stock acidic $^{68}$Ge solution was loaded onto a sorbent column using a peristaltic pump, with a flow rate of 0.15 mL/minute. Following the loading, the column was washed with 15 mL 0.1 M HCl solution. The column was then ready for regular eluting (separating) $^{68}$Ga daughter radioisotope solutions for daily use.

Eluting $^{68}$Ga

Figure 13:
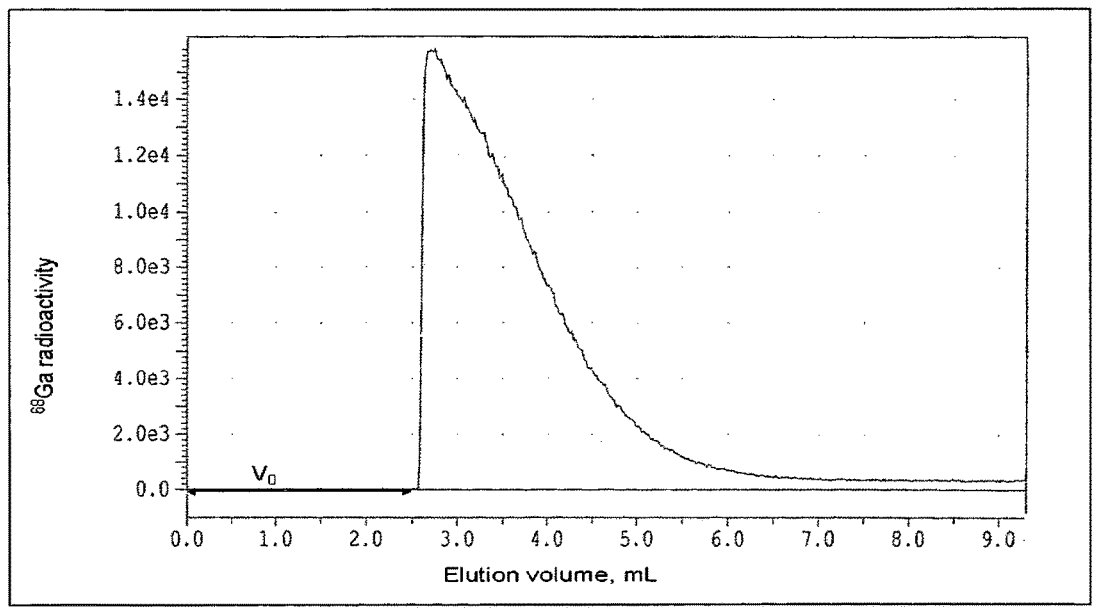
FIG. 13: $^{68}$Ga elution profile of a ZT-11 sorbent packed $^{68}$Ge/$^{68}$Ga generator column.

The column was eluted with a dilute acidic solution using 5 mL 0.1 M HCl solution: FIG. 13 shows the elution profile of the $^{68}$Ga from the sorption column. The initial lag is due to the tubing volume (2.5 mL) of the graphic radioactivity recording system (which is not a part of the $^{68}$Ge generator system described in this invention) and almost all of the elution of $^{68}$Ga occurred within about the first 4 mL. Table 11 shows the performance of the ZT-11 column (1 g sorbent) compared with earlier devices. An 80% elution yield in Table 11 indicates that 20% $^{68}$Ga was sorbed very strongly in some unknown chemical form on the sorbent column. The present invention provides improved elution yield, lower $^{68}$Ge breakthrough, a more benign medium for the purified $^{68}$Ga, automatised operation and longer useful life.

TABLE 11

Performance of ZT-11 sorbent column based $^{68}$Ga generator and comparison

| | Present invention | Earlier device 1 | Earlier device 2 |
|---|---|---|---|
| $^{68}$Ga elution yield, % | 73-80 | 70-75 | 70-80 |
| $^{68}$Ge breakthrough, % | 3 × 10$^{-4}$ | 3.3 × 10$^{-3}$ | 10$^{-3}$ |
| $^{68}$Ga solution (eluate) | 0.1M HCl | 0.1M HCl | 0.6M HCl |
| Eluate volume, mL | 4 mL | 5 mL | 5 mL |
| Operation mode | Automatic/Manual | Manual | Manual |
| Guaranteed useful life | 1.5 year or 500 elutions | 1 year | 1 year |

Example 7

Figure 15:
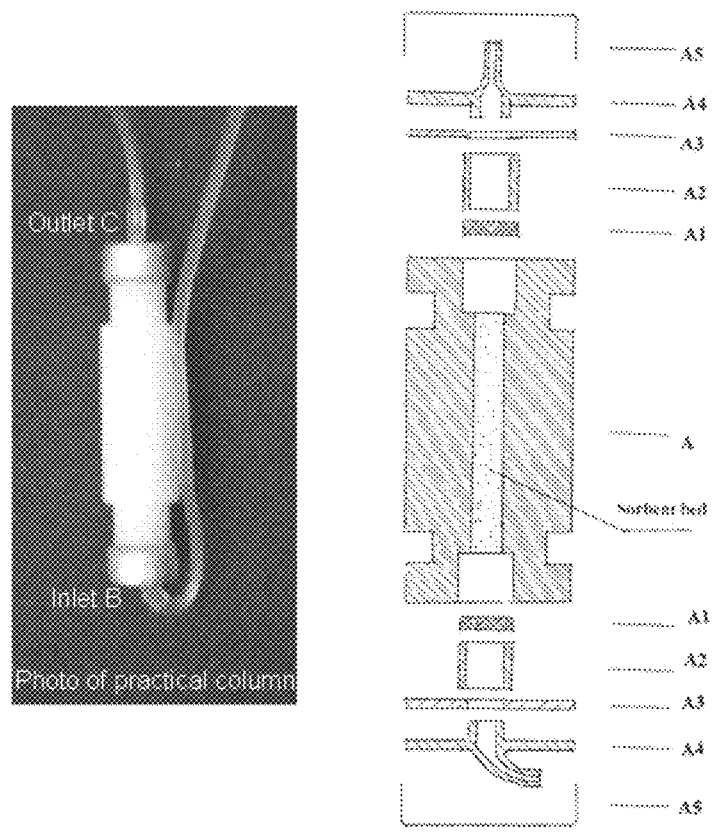
FIG. 15: Photograph of a ZT-11 sorbent packed generator column with tubing connection to its inlet (B) and outlet (C) and details of the generator column and parts.

A suitable apparatus (generator) for separating $^{68}$Ga from mixtures of $^{68}$Ge ions and $^{68}$Ga ions, is described with reference to FIGS. 15 and 16. Column A, shown in FIG. 15, is made from glass or thermoplastic material (such as polyetheretherketone (PEEK), polypropylene, polyethylene, cellulose acetate etc.) and is provided with fritted sintered quartz or flitted polypropylene filter disks (A1) at both its ends. The ends are closed by a polypropylene plastic septa (A4) together with neoprene (A2) and silicon rubber (A3)

gaskets. The column is capped by aluminum clamping lids (A5). The column is from 40 mm to 50 mm in length and 6.5 mm inner diameter. The effective sorbent bed volume in the column is 800 μL. The fitted filter disks are of 20 μm porosity. The column is packed with a sorbent which is described elsewhere herein, and which has a higher affinity for $^{68}$Ge than for $^{68}$Ga. The sorbent column is housed in a radiation protection shielding lead container (Pb—FIG. 16) which is provided with two ports P1 and P2 for the tubing to the outlet (C) and inlet (B) of the sorbent column A. $^{68}$Ga acidic eluent supply system (E) comprising an eluent container, is coupled to the sorbent column inlet (B) for supplying an eluent to the sorbent column inlet. The apparatus comprises peristaltic pump (D) for causing liquids to pass through sorbent column A. Pump (D) may be separately installed (i.e. may be a dedicated part of the apparatus) or may be shared with a pump located in a $^{68}$Ga purification/concentration system (PCS). (A suitable $^{68}$Ga purification/concentration is system is described in a copending application.) Pump D is located downstream of sorbent column A so as to cause the liquids to pass through said column by way of suction from the pump. Inlet valve (V) is coupled to the sorbent column inlet. B. When inlet valve (V) is in a first position, eluent from eluent supply system E is directed to a product container (G) and when inlet valve (V) is in a second position, eluent flow from eluent supply system (E) is stopped. Product container (G) is preferably also shielded by means of lead radiation protection shielding. Preferably operation of pump (P) is coordinated with valve (V) so that, when pump (P) is off, valve (V) is closed (i.e. in the second position) and when pump (P) is on, valve (V) is open (i.e: in the first position). Controller (F) (e.g. comprising a computer or PLC) is provided for controlling the operation of the generator. It may for example be capable of operating valve (V), pump (P) and (if present) purification/concentration system (PCS).

Figure 16:
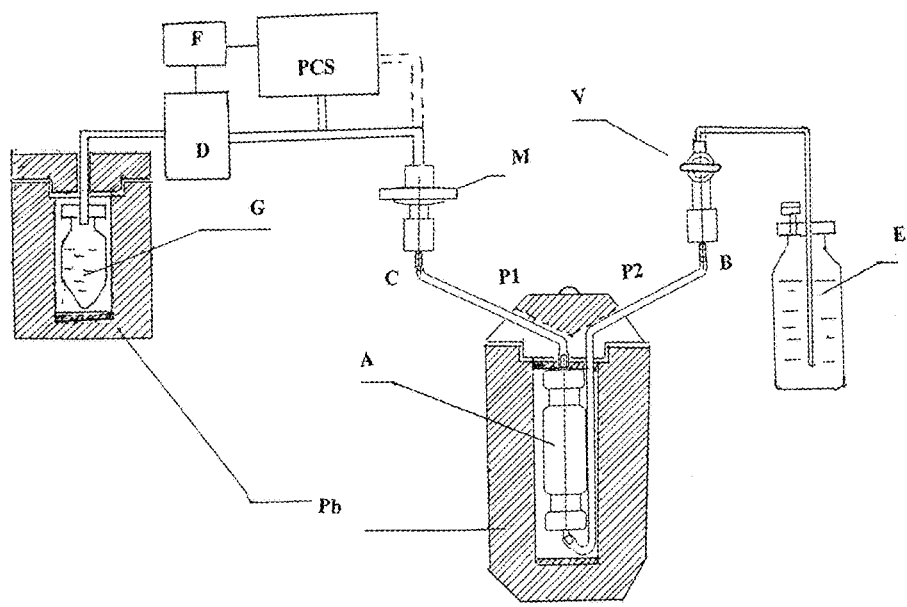
FIG. 16: A diagram of a radionuclide generator in connection to peristaltic pump (D), purification/concentration system (PCS), eluent supply system (E) and radionuclide eluate container (G).

In operation of the apparatus of FIGS. 15 and 16, 0.1M HCl solution is used as an eluent of $^{68}$Ga. Thus eluent supply system (E) is loaded with this eluent solution. The sorbent in column (A) is loaded with $^{68}$Ge. On the sorbent, this gradually decays to form $^{68}$Ga. When a solution of $^{68}$Ga is required, valve (V) is opened and pump (D) is turned on. This causes eluent to flow from eluent supply system (E) through column (A) so as to elute $^{68}$Ga into $^{68}$Ga product container (G). The eluent flow rate through column (A) is controlled within a range of about 1.0 mL/minute to 5 mL/minute. Since the affinity of the sorbent in column (A) for $^{68}$Ge is high, negligible or zero amounts of $^{68}$Ge are eluted from the sorbent. However, as the affinity of the sorbent in column (A) for $^{68}$Ga is quite low, this species is readily eluted, resulting in an eluent collected in container (G) which comprises a solution of $^{68}$Ga substantially free of $^{68}$Ge.

The invention claimed is:

1. A sorbent for sorbing radioactive ions, said sorbent comprising a porous crystalline powder of a metal oxide or mixed metal oxide having a particle diameter of between about 10 and about 100 microns and having an affinity for $^{68}$Ge at least about 10 times its affinity for $^{68}$Ga, said sorbent comprising mesopores of 2 to 50 nm in mean diameter and macropores of greater than 50 nm in mean diameter, said powder having crystallinity of at least about 80%.

2. The sorbent of claim 1 wherein the metal(s) of the metal oxide or mixed metal oxide are transition metals.

3. The sorbent of claim 2 wherein the metal(s) are each selected from the group consisting of Zr, Ti, Sn and Ge.

4. The sorbent of claim 3 wherein the metal(s) are in the +IV oxidation state.

5. The sorbent of claim 1 having a particle diameter between about 50 and about 100 microns.

6. A process for making a sorbent for sorbing radioactive ions, said sorbent comprising a porous crystalline powder of a metal oxide or mixed metal oxide having a particle diameter of between about 10 and about 100 microns and having an affinity for $^{68}$Ge at least about 10 times its affinity for $^{68}$Ga, said sorbent comprising mesopores of 2 to 50 nm in mean diameter and macropores of greater than 50 nm in mean diameter, said powder having crystallinity of at least about 80%, said process comprising:
  a) reacting a metal halide or a mixture of metal halides and an alcohol to form a gel;
  b) heating the gel to form a particulate material;
  c) exposing the particulate material to an oxidant to form a powder; and
  d) heating the powder to a temperature sufficient to at least partially melt or sinter particles of the powder so as to form the sorbent as a porous crystalline powder of an oxide of the metal or metals having a particle diameter of between about 10 and about 100 microns and having an affinity for $^{68}$Ge at least 10 times its affinity for $^{68}$Ga, said sorbent having a bimodal distribution of pore sizes comprising mesopores of about 2 to about 50 nm in mean diameter and macropores of greater than about 50 nm in diameter and crystallinity of at least about 80%.

7. The process of claim 6 wherein the metal halide(s) are transition metal halide(s).

8. The process of claim 7 wherein the metal halide(s) are halides of tetravalent transition metals.

9. The process of claim 8 wherein the transition metals of the metal halides are each selected from the group consisting of Zr, Ti, Sn and Ge.

10. The process of claim 6 wherein the halide is chloride.

11. The process of claim 6 wherein the alcohol is a C2 to C4 alkanol.

12. The process of claim 11 wherein the alcohol is isopropanol.

13. The process of claim 12 wherein the molar ratio of metal halide(s) to alcohol is about 1:3 to about 1:10.

14. The process of claim 6 wherein step a) comprises:
  a-1) forming a reaction mixture from the metal halide or mixture of metal halides and the alcohol;
  a-2) allowing the reaction mixture to heat spontaneously to an elevated temperature and maintaining the reaction mixture at the elevated temperature for sufficient time to obtain a viscous solution, and
  a-3) raising the temperature of the viscous solution to a gelation temperature to form the gel.

15. The process of claim 14 wherein the elevated temperature is about 60 to about 100° C.

16. The process of claim 14 wherein the sufficient time is about 2 to about 5 hours.

17. The process of claim 14 wherein the gelation temperature is about 110 to about 125° C.

18. The process of claim 6 wherein step b) comprises heating the gel to a particle formation temperature for sufficient time to convert the gel to the particulate material.

19. The process of claim 18 wherein the particle formation temperature is about 130 to about 150° C.

20. The process of claim 18 wherein the sufficient time in step b) is about 30 to about 60 minutes.

21. The process of claim 6 wherein the oxidant comprises aqueous hypochlorite and sodium hydroxide solution.

22. The process of claim 6 wherein the sufficient temperature of step d) is at least about 500° C.

23. A separation column for separating a first ion from a second ion, said column comprising:
- a housing comprising a body, an inlet and an outlet;
- a valve coupled to the outlet for controlling flow of a liquid from the column;
- a sorbent comprising a porous crystalline powder of a metal oxide or mixed metal oxide having a particle diameter of between about 10 and about 100 microns and having an affinity for $^{68}$Ge at least about 10 times its affinity for $^{68}$Ga, said sorbent having a bimodal distribution of pore sizes comprising mesopores of about 2 to about 50 nm in mean diameter and macropores of greater than about 50 nm in diameter and crystallinity of at least about 80%, and said sorbent being disposed in the body of the housing, said sorbent having a higher affinity for the first ion than for the second ion; and
- a liquid permeable restrictor disposed between the sorbent and the valve for preventing exit of the sorbent from the body of the housing.

24. The separation column of claim 23 wherein the housing, the valve and the restrictor are all constructed from materials that are not rapidly degraded by radioactivity from the first and/or second ion.

25. The separation column of claim 23 comprising a radiation shield at least partially surrounding the housing and the valve.

26. A generator for generating a solution of a radioactive ion, said generator comprising a separation column for separating a first ion from a second ion,
said column comprising:
- a housing comprising a body, an inlet and an outlet;
- a valve coupled to the outlet for controlling flow of a liquid from the column;
- a sorbent comprising a porous crystalline powder of a metal oxide or mixed metal oxide having a particle diameter of between about 10 and about 100 microns and having an affinity for $^{68}$Ge at least about 10 times its affinity for $^{68}$Ga, said sorbent having a bimodal distribution of pore sizes comprising mesopores of about 2 to about 50 nm in mean diameter and macropores of greater than about 50 nm in diameter and crystallinity of at least about 80%, and said sorbent being disposed in the body of the housing, said sorbent having a higher affinity for the first ion than for the second ion; and
- a liquid permeable restrictor disposed between the sorbent and the valve for preventing exit of the sorbent from the body of the housing,
said generator having a generating radioactive ion sorbed on the sorbent thereof, wherein the generating radioactive ion is such that it decays to produces the radioactive ion and wherein the generating radioactive ion has a greater affinity for the sorbent than does the radioactive ion.

27. A method of making a generator for generating a solution of a radioactive ion, said method comprising passing a solution comprising a generating radioactive ion into a sorbent comprising a porous crystalline powder of a metal oxide or mixed metal oxide having a particle diameter of between about 10 and about 100 microns and having an affinity for $^{68}$Ge at least about 10 times its affinity for $^{68}$Ga, said sorbent having a bimodal distribution of pore sizes comprising mesopores of about 2 to about 50 nm in mean diameter and macropores of greater than about 50 nm in diameter and crystallinity of at least about 80%, so as to sorb said generating radioactive ion onto the sorbent, said generating radioactive ion being such that it decays to produces the radioactive ion and said generating radioactive ion having a greater affinity for the sorbent than does the radioactive ion.

28. The method of claim 27 wherein said sorbent is disposed in a column during and after said passing.

29. The method of claim 28 comprising at least partially surrounding said column by a radiation proof housing.

30. A method for generating a solution of a radioactive ion comprising:
- providing a sorbent comprising a porous crystalline powder of a metal oxide or mixed metal oxide having a particle diameter of between about 10 and about 100 microns and having an affinity for $^{68}$Ge at least about 10 times its affinity for $^{68}$Ga, said sorbent having a bimodal distribution of pore sizes comprising mesopores of about 2 to about 50 nm in mean diameter and macropores of greater than about 50 nm in diameter and crystallinity of at least about 80%, and said sorbent having sorbed thereon a generating radioactive ion, said generating radioactive ion being such that it decays to produces the radioactive ion and said generating radioactive ion having a greater affinity for the sorbent than does the radioactive ion; and
- eluting the radioactive ion from the sorbent using an eluent.

31. The method of claim 30 wherein the generating radioactive ion is $^{68}$Ge whereby the radioactive ion is $^{68}$Ga.

32. The method of claim 30 wherein the eluent is a mineral acid.

33. The method of claim 30 wherein the step of providing the sorbent having the generating radioactive ion sorbed thereon comprises passing a solution comprising the generating radioactive ion into the sorbent so as to sorb said generating radioactive ion onto the sorbent.

34. The method of claim 30 wherein the step of eluting is conducted a plurality of times, each eluting step other than the first being separated from the previous eluting step by a time of about 0.5 to about 2 half-lives of the radioactive ion.

\* \* \* \* \*